Oct. 16, 1962  L. A. WILLIAMS  3,058,895
ELECTROLYTIC SHAPING
Filed Nov. 10, 1958  15 Sheets-Sheet 1
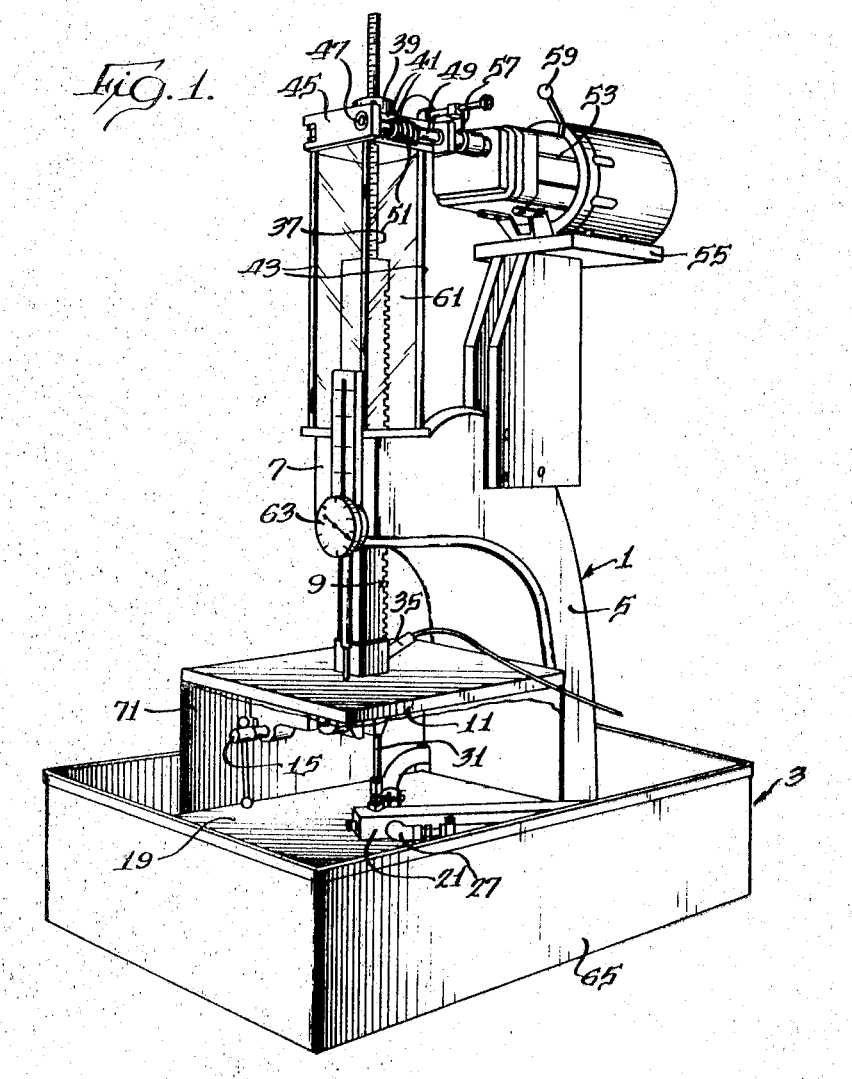
INVENTOR.
Lynn A. Williams
BY
Wupper, Tradolph & Love
Attys.

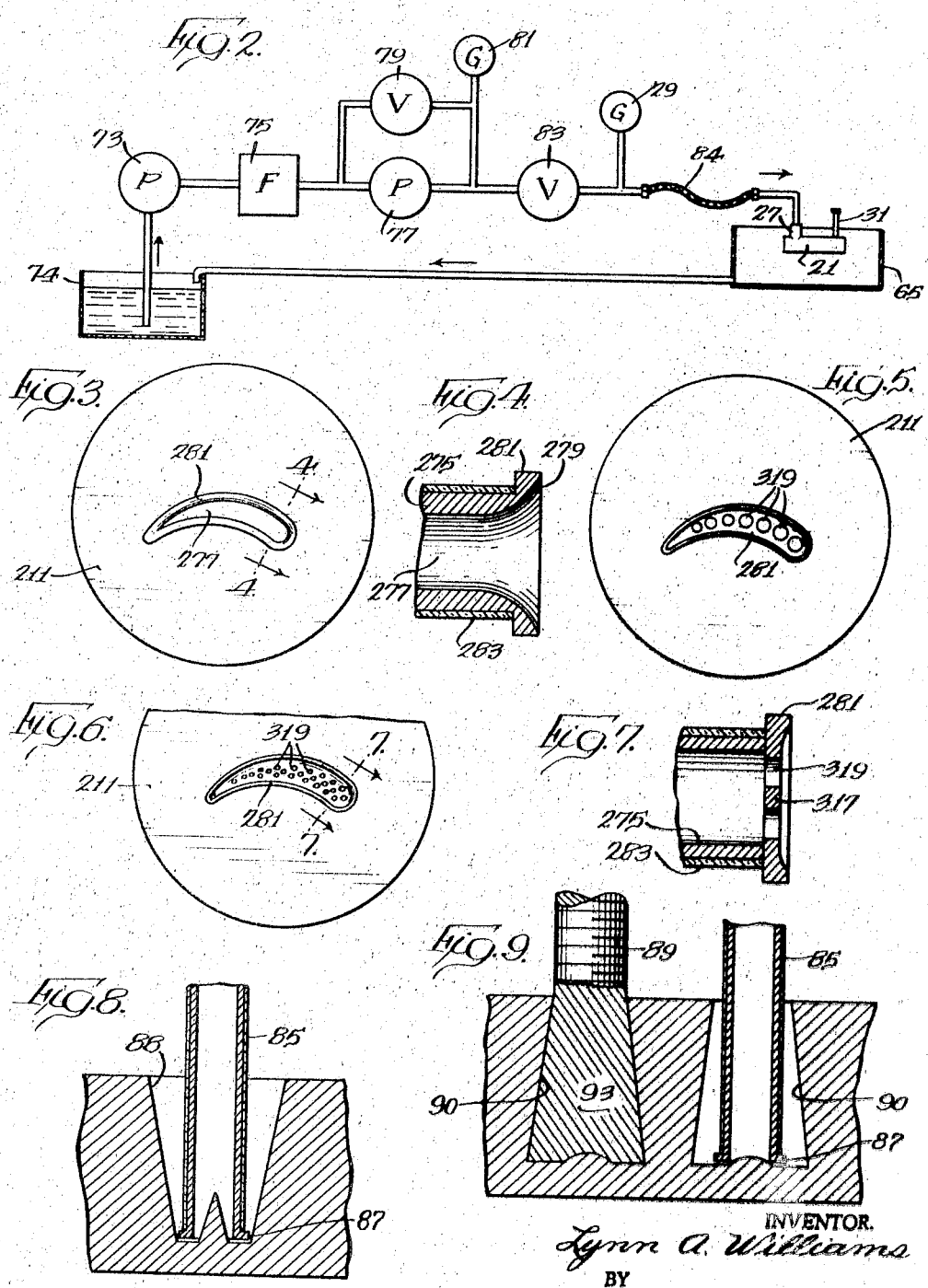

Oct. 16, 1962 L. A. WILLIAMS 3,058,895
ELECTROLYTIC SHAPING
Filed Nov. 10, 1958 15 Sheets-Sheet 3

INVENTOR.
Lynn A. Williams
BY

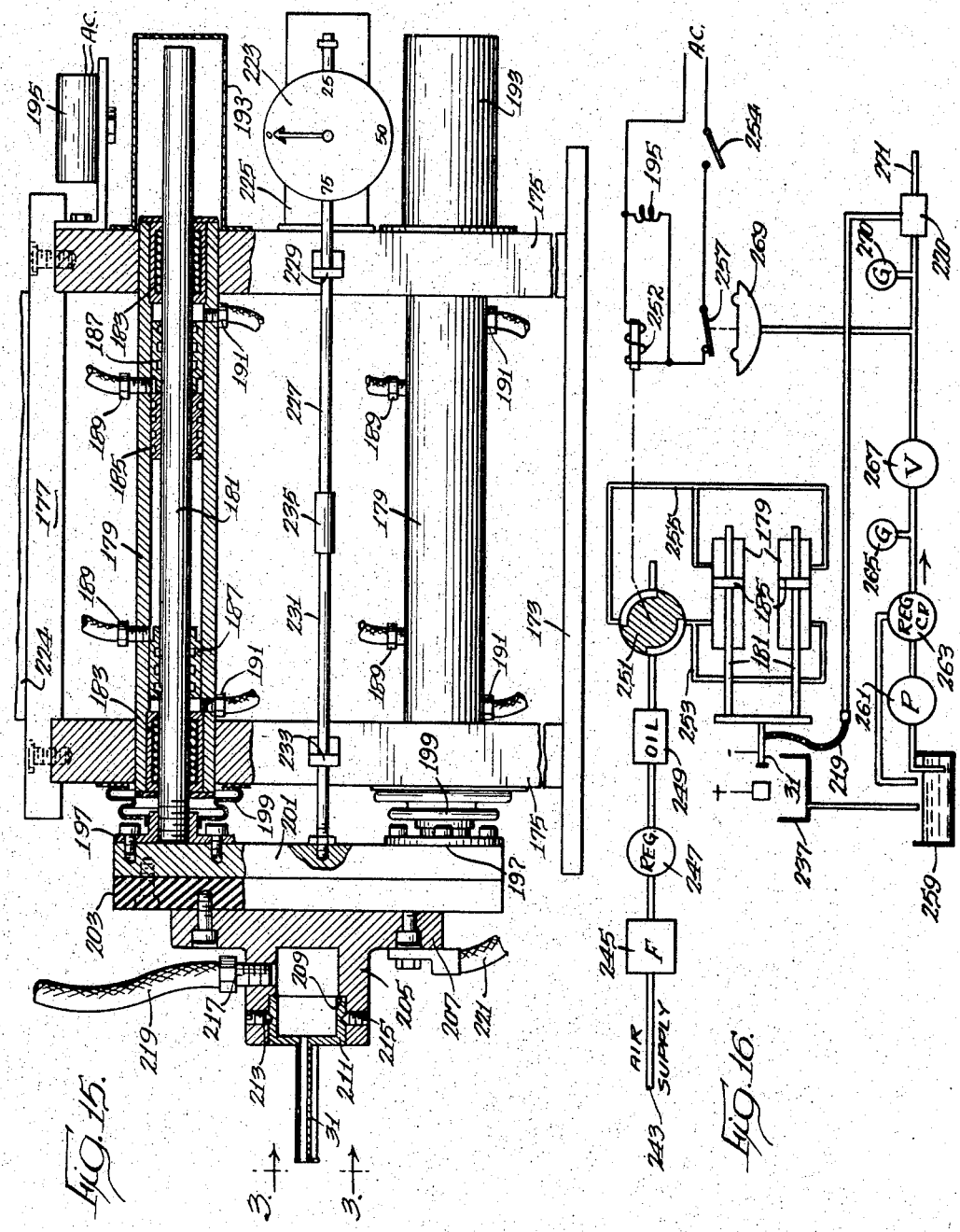

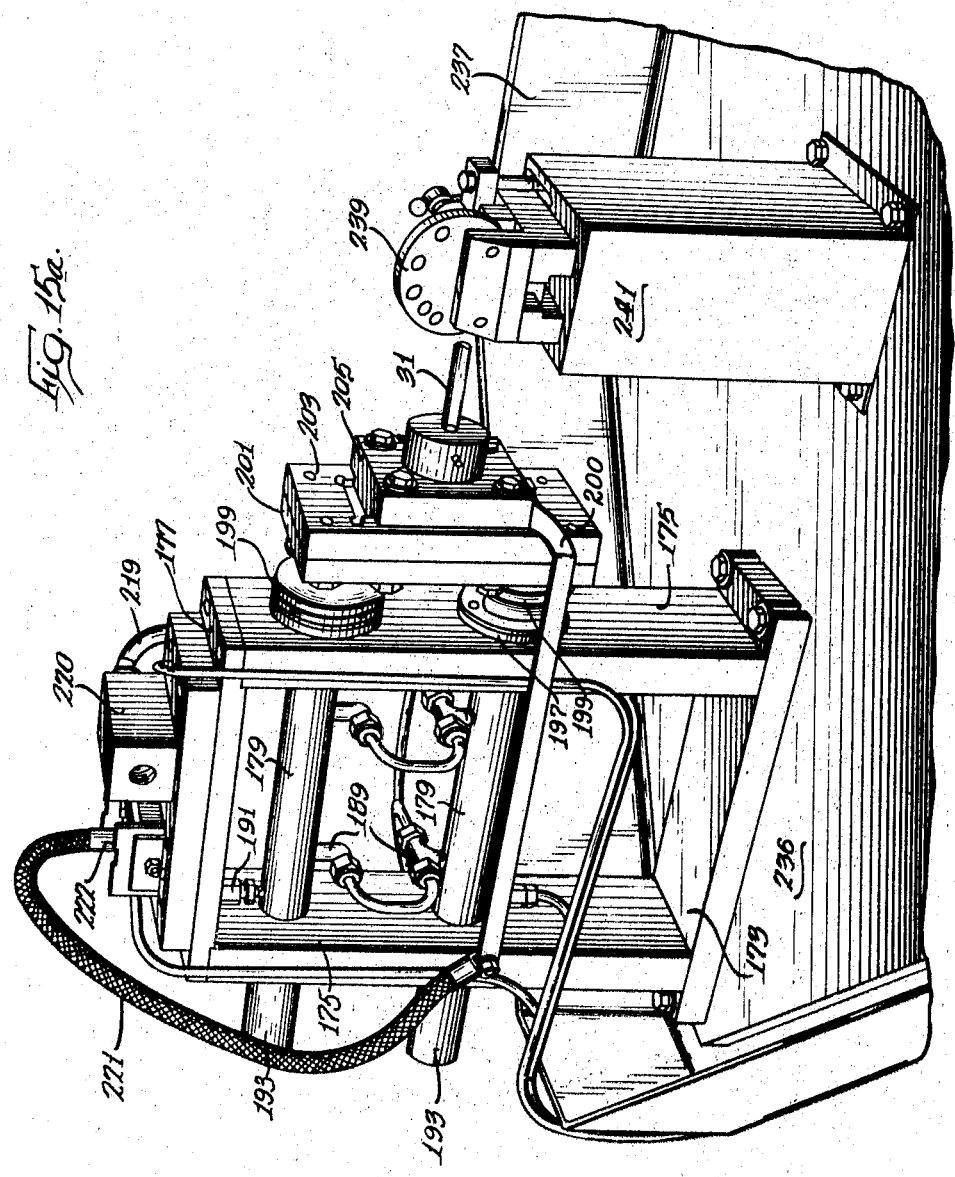

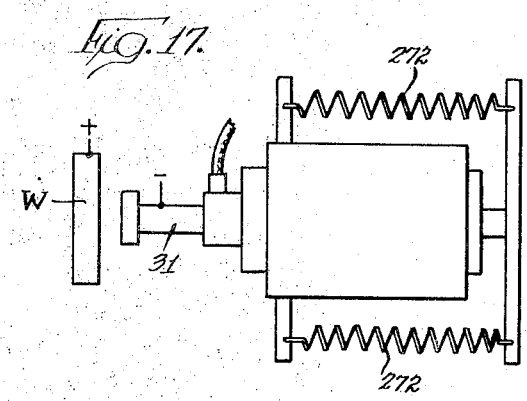
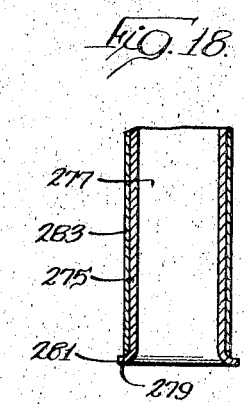
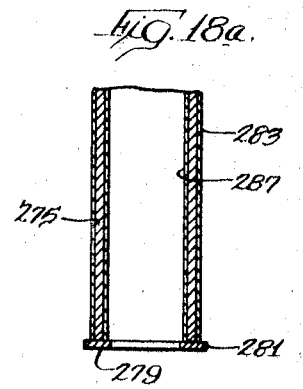
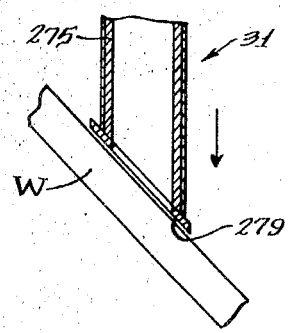

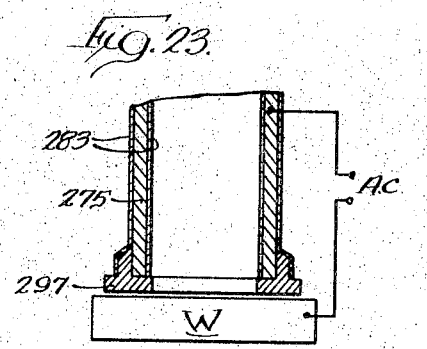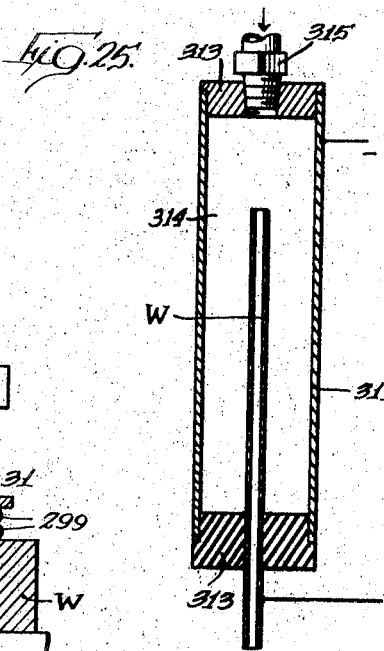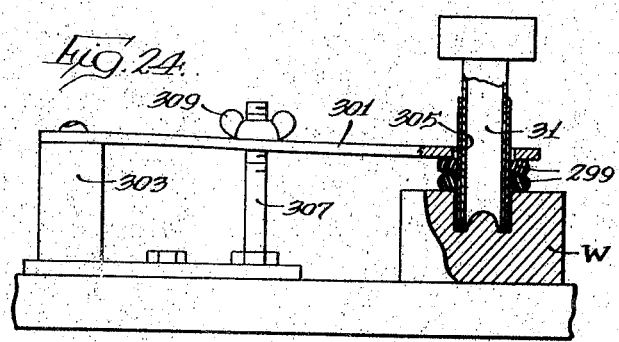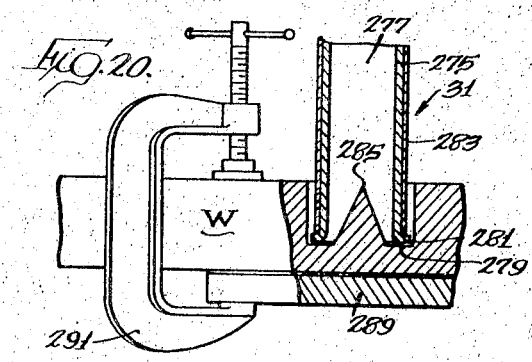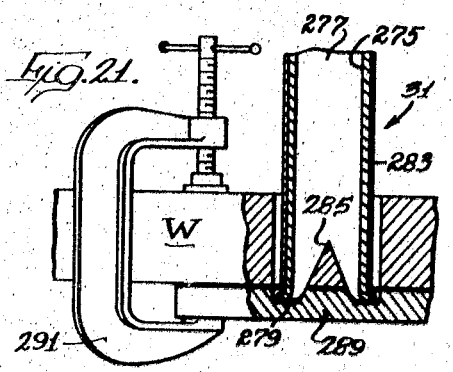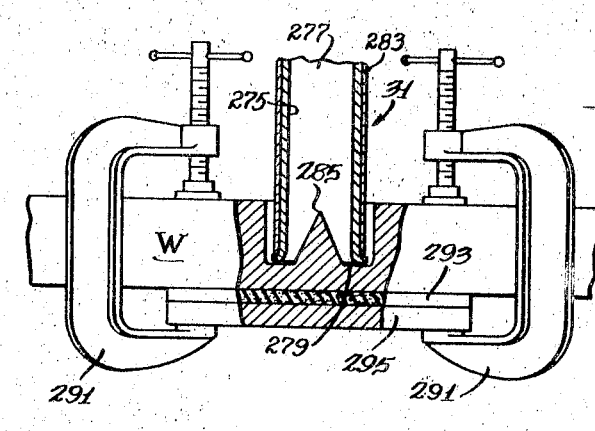

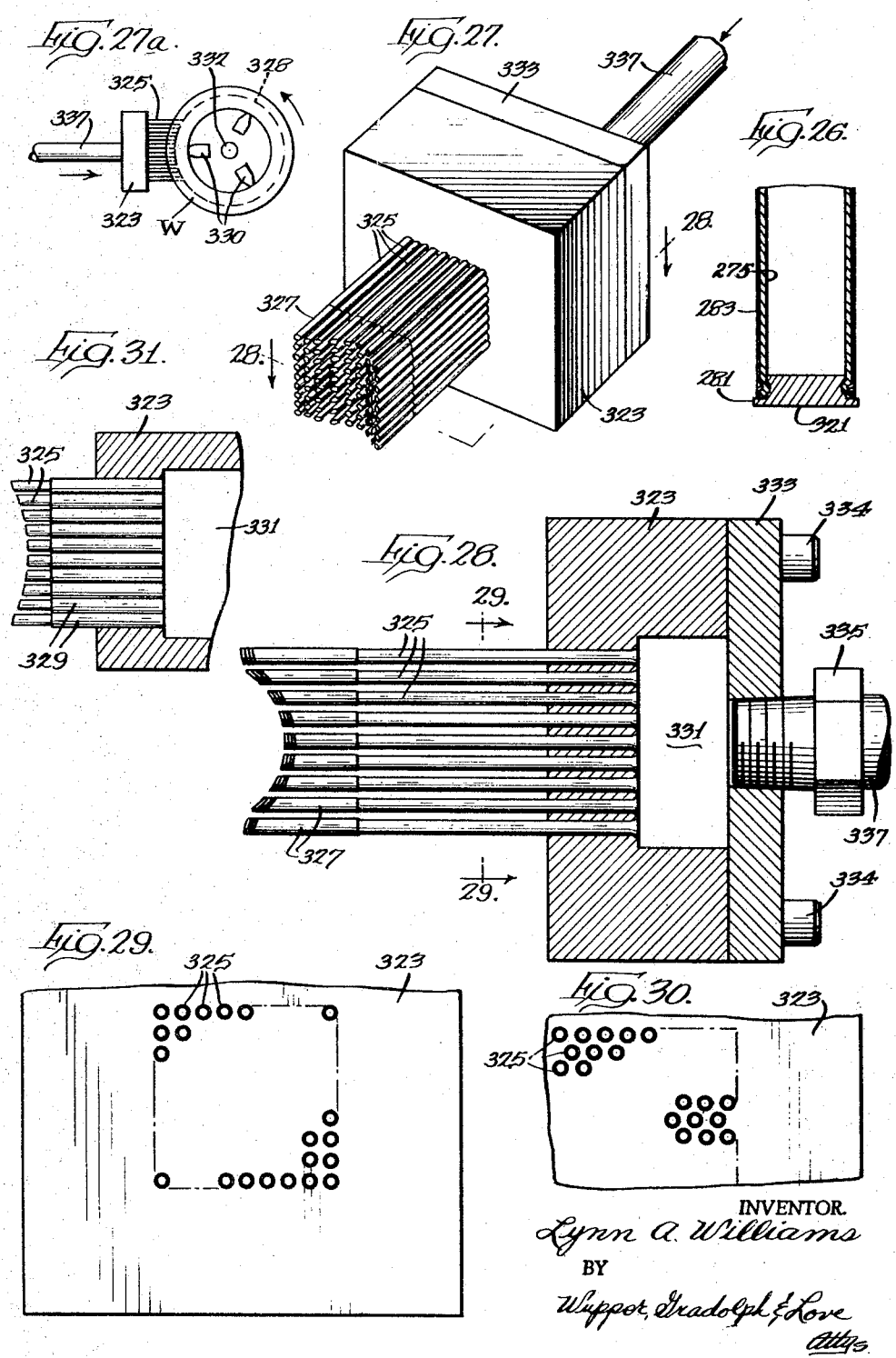

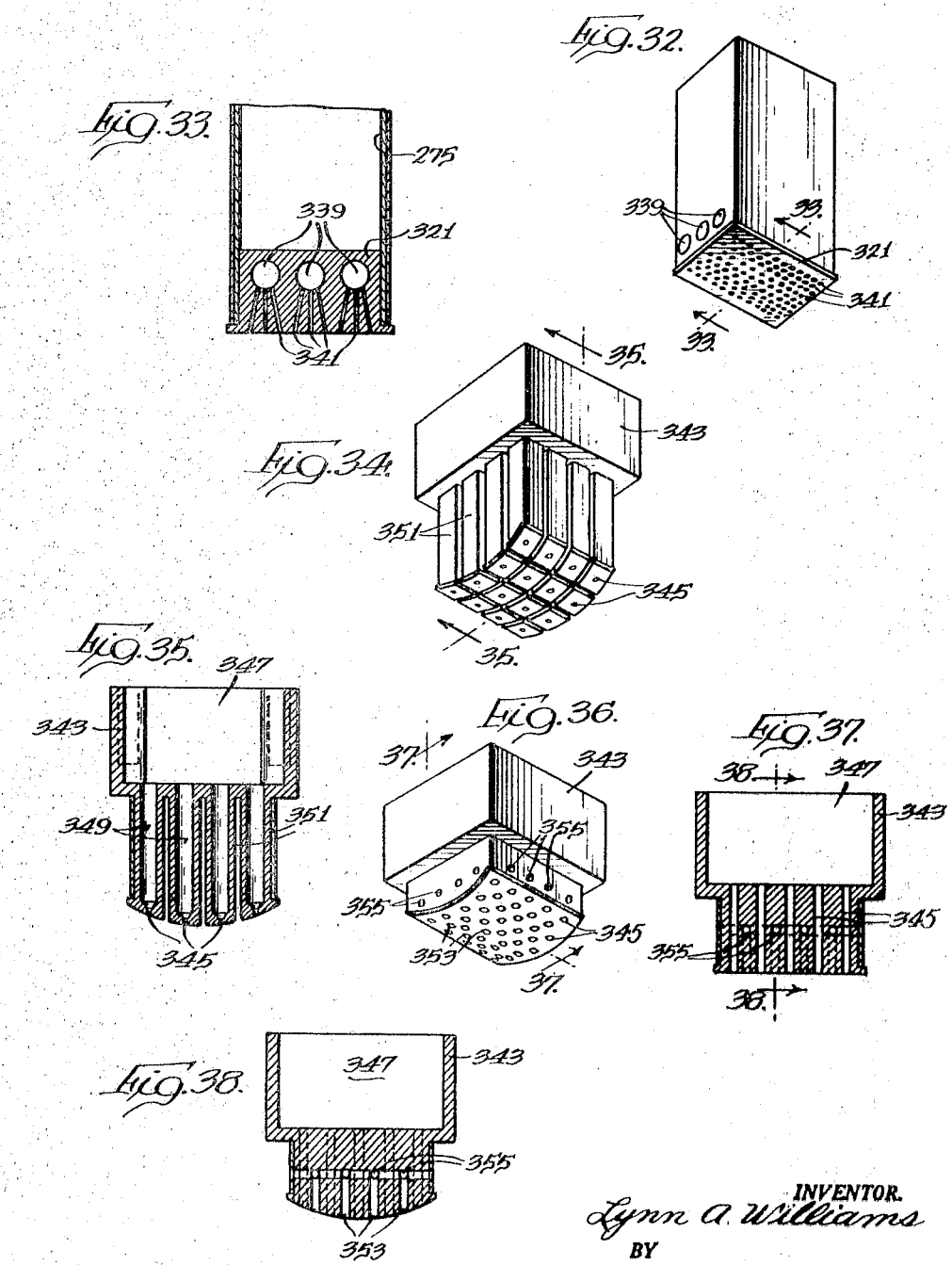

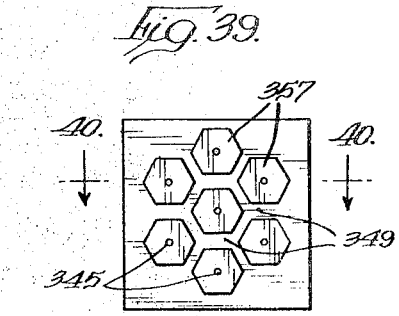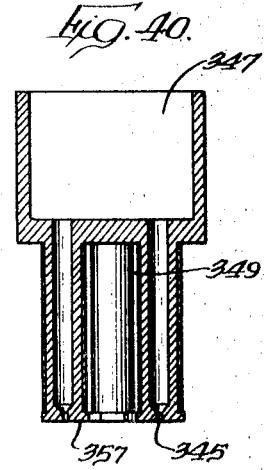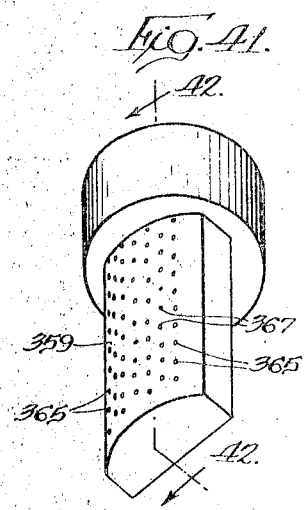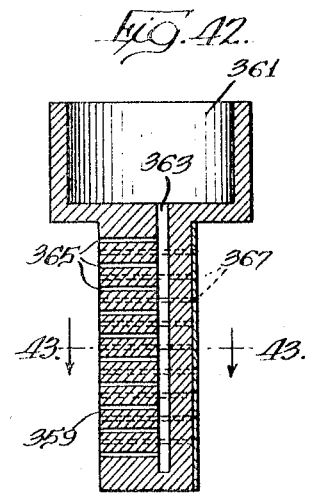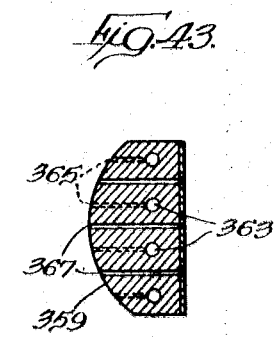

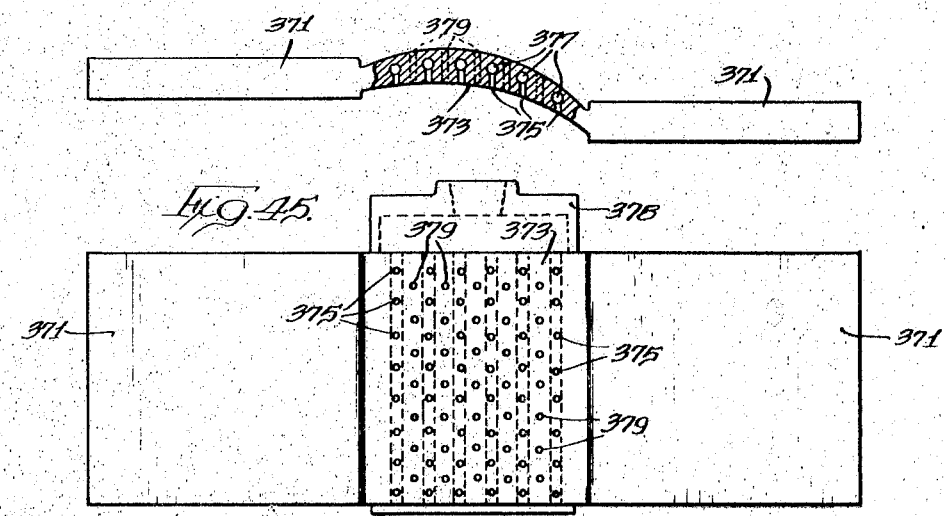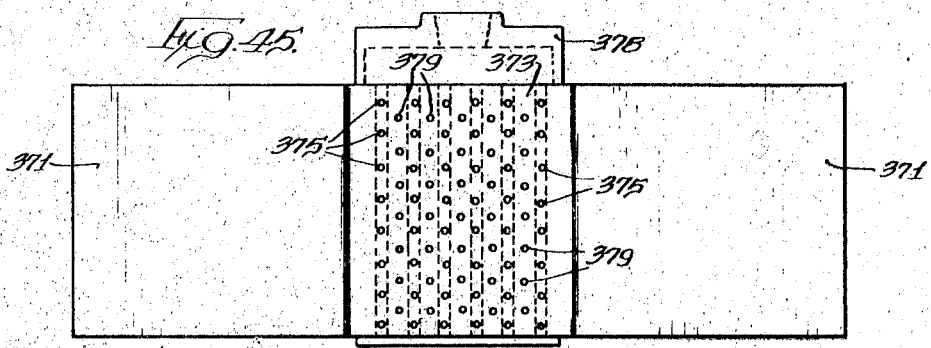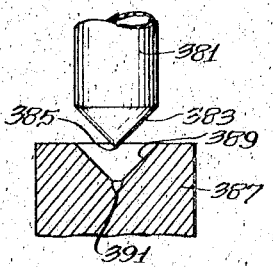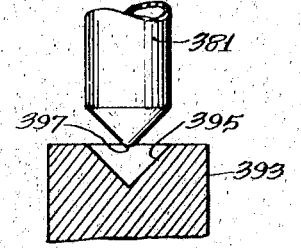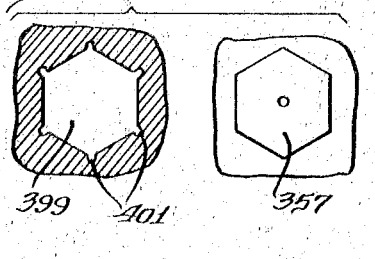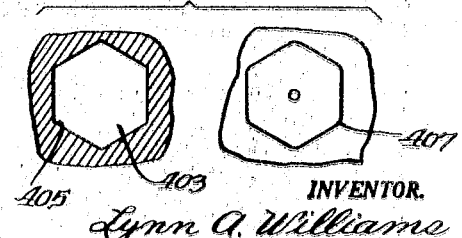

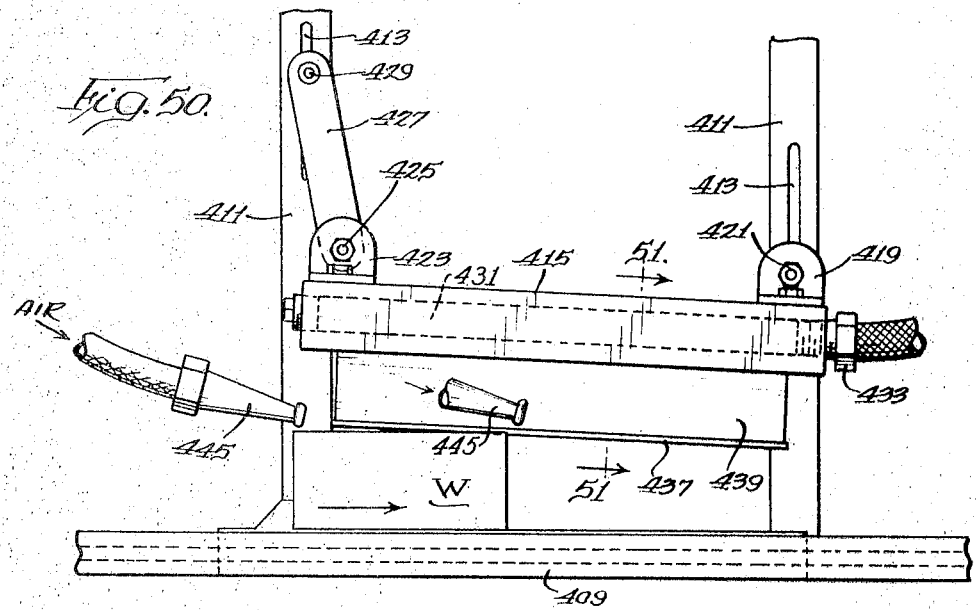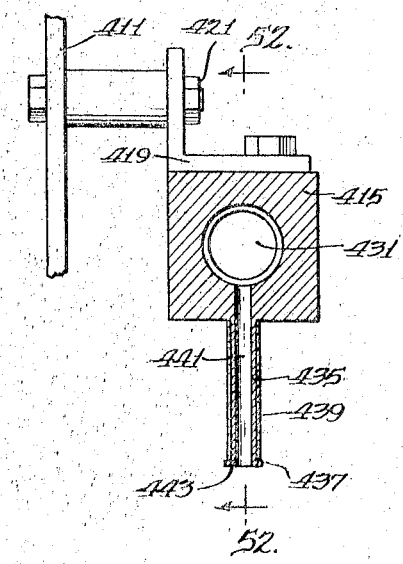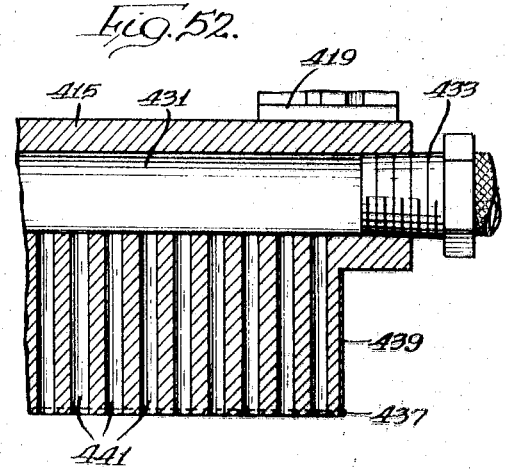

Oct. 16, 1962 L. A. WILLIAMS 3,058,895
ELECTROLYTIC SHAPING
Filed Nov. 10, 1958 15 Sheets-Sheet 14

INVENTOR.
Lynn A. Williams
BY
Wypper, Bradolph & Love
Attys.

Oct. 16, 1962 L. A. WILLIAMS 3,058,895
ELECTROLYTIC SHAPING
Filed Nov. 10, 1958 15 Sheets-Sheet 15
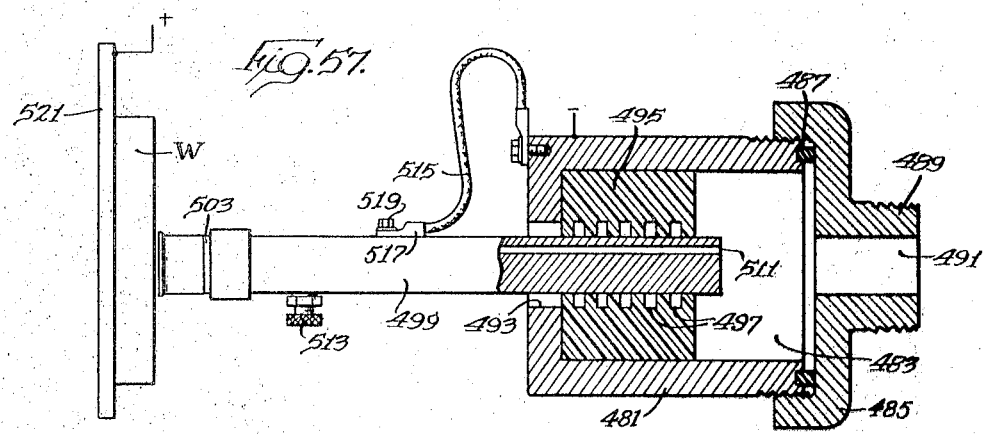
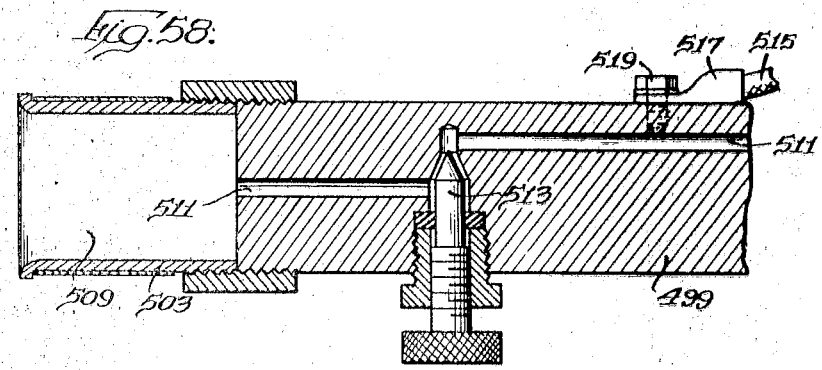
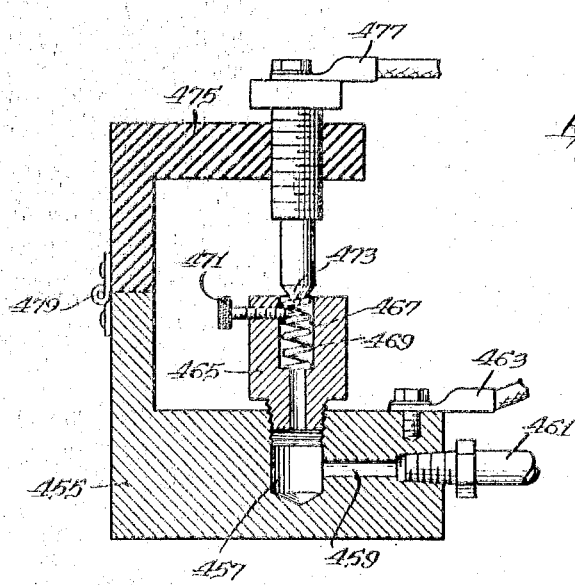
INVENTOR.
Lynn A. Williams
BY
Wypper, Bradolph & Love
Attys.

United States Patent Office 3,058,895
Patented Oct. 16, 1962

3,058,895
ELECTROLYTIC SHAPING
Lynn A. Williams, Winnetka, Ill., assignor to Anocut Engineering Company, Chicago, Ill., a corporation of Illinois
Filed Nov. 10, 1958, Ser. No. 772,960
19 Claims. (Cl. 204—143)

This invention relates to methods and apparatus for the use of electrolysis in shaping of metal and metalloid materials.

It has long been known that metal and metalloid materials may be removed by electrolytic attack in a configuration where the metal or metalloid workpiece is the anode in an electrolytic cell. This principle has been used industrially to some degree for the removal of defective plating and the like, and is sometimes referred to as "stripping." It has also been used to some extent for electrolytic polishing, in which application, however, the principal purpose is to produce a smooth finish with a minimum removal of the work material. Here the purpose is to remove substantial amounts of metal rapidly and with accuracy.

In the present instance, the term "metalloid" is used somewhat specially in referring to those electrically conductive materials which act like metals when connected as an anode in an electrolytic cell. The term as used here and in the claims includes metals and such similarly acting materials as tungsten carbide for instance, and distinguishes from such conductive nonmetalloids as carbon.

George F. Keeleric has proposed in his Patent No. 2,826,540, issued March 11, 1958, for "Method and Apparatus for Electrolytic Cutting, Shaping and Grinding," the use of electrolysis in conjunction with a metal-bonded, abrasive-bearing, moving electrode, and the method and apparatus of this Keeleric patent have found extensive industrial use.

The present invention departs from the teachings of Keeleric in utilizing relatively fixed or slow-moving electrodes without abrasive, and is intended for work of a quite different character, as will appear in the detailed description of the invention which follows.

In general, in the present invention a hollow electrode is advanced into the work material by mechanical means while electrolyte is pumped through the hollow portion of the electrode under substantial pressure. In some circumstances, the side walls of the electrode are protected by an insulating material so as to minimize removal of work material except where desired. Various forms of electrodes are used for different kinds of work, and likewise, different methods of advancing the electrode toward and into the work material are used, depending upon the nature of the operation to be performed. An important aspect of the invention lies in providing electrodes in which a flow of electrolyte between the electrode and the work is maintained at high velocity and across a short path between the point of entry and the area of exit regardless of the overall size of the electrode. An electric current is supplied so that current passes from the electrode, which is negative, through the electrolyte to the workpiece, which is positive. For purposes of shaping the electrodes, direct current may be passed in the opposite sense to make the electrode positive. In some instances, alternating current may be used.

Among the objects of the invention are the following:

To provide novel means and methods for rapid removal of work material by electrolytic means;

To provide novel methods and apparatus for imparting desired shapes and contours to a workpiece by electrolytic action;

To provide improved electrodes for electrolytic shaping of work materials;

To provide a novel method for producing shaped electrodes;

To provide automatic means for advancing electrodes toward and into the work material;

To provide novel mechanism for accomplishing variable feed rates for advancing electrodes toward and into work material for electrolytic removal thereof; and To provide a novel method and apparatus for electrolytic polishing of workpieces.

Other objects and advantages will become apparent from the following description of my invention which is illustrated in the accompanying drawings.

In the drawings in which similar characters of reference refer to similar parts throughout the several views:

FIG. 1 is a perspective view of one form of apparatus embodying the present invention which is effective for practicing the inventive method;

FIG. 2 is a diagrammatic representation of an electrolyte supply system which forms a portion of the apparatus of FIG. 1;

FIG. 3 is an end view of one type of electrode used with the apparatus of the present invention;

FIG. 4 is an enlarged sectional view through a portion of the electrode of FIG. 3, and may be considered as taken in the direction of the arrows substantially along the line 4—4 of FIG. 3;

FIGS. 5 and 6 are end views similar to FIG. 3 showing variations of the electrode of the general type of FIG. 3;

FIG. 7 is an enlarged fractional sectional view which may be considered as taken in the direction of the arrows substantially along the lines 7—7 of FIG. 6;

FIGS. 8 and 9 are transverse sectional views taken through a typical electrode of the present invention, and the work associated therewith showing the influence upon the work of the speed of advance of the electrode;

FIG. 15 is a side view, partly in section, of yet another form of the apparatus which inherently advances the electrode into the work at the proper rate;

FIG. 15a is a perspective view of the apparatus of FIG. 15;

FIG. 16 is a diagrammatic representation of the electrical, pneumatic, and electrolyte supply systems for the apparatus of FIGS. 15 and 15a;

FIG. 17 is a diagrammatic representation of a simple form of the apparatus using a spring-loading means for advancing the electrode;

FIG. 18 is a longitudinal medial sectional view through a typical electrode showing the general arrangement and conformation of the elements thereof;

FIG. 18a is a view generally similar to FIG. 18, but illustrating an electrode adapted for a trepanning operation;

FIG. 19 is a side elevation of the working tip of the electrode and the work to be operated upon in a typical application where the electrode is advanced into the work at an angle to the work surface;

FIGS. 20 and 21 are side elevations, partly in section, showing a preferred arrangement for electrolytically piercing a hole completely through a workpiece;

FIG. 22 is similar to FIGS. 20 and 21, but shows an alternative arrangement for piercing a hole through the workpiece from one side to the other thereof;

FIG. 23 is a longitudinal sectional view of an alternative form of electrode particularly adapted for use with alternating current;

FIG. 24 is a side elevation partly in section illustrating an arrangement for electrolytically producing a cavity under conditions where it is desired to have a high spectral finish upon the walls thereof;

FIG. 25 is a longitudinal sectional view showing an arrangement for electrolytically polishing a workpiece according to the present method;

FIG. 26 is a longitudinal sectional view through an alternative electrode tip which makes use of a porous metal element at the working face thereof;

FIG. 27 is a perspective view of one type of electrode for forming comparatively large cavities of irregular shape in the bottom surface thereof;

FIG. 27a shows an adaptation of the electrode of FIG. 27 to operation upon a rotating workpiece;

FIG. 28 is a sectional view through the electrode of FIG. 27, and may be considered as taken substantially along the line 28—28 of FIG. 27;

FIG. 29 is a transverse sectional view through a portion of the electrode of FIG. 28 and may be considered as taken in the direction of the arrows substantially along the line 29—29 of FIG. 28;

FIG. 30 is a view similar to FIG. 29 but showing an alternative arrangement of the electrode elements which may be used in place of the arrangement of FIG. 29;

FIG. 31 is a longitudinal sectional view through an electrode generally similar to that of FIG. 28 but illustrating an alternative method for constructing the electrode;

FIG. 32 is a perspective view of the working end of an electrode in which the working tip is formed of porous metal and particularly adapted for sinking cavities of comparatively large area;

FIG. 33 is a transverse sectional view which may be considered as taken in the direction of the arrows substantially along the line 33—33 of FIG. 32;

FIG. 34 is a perspective view of an alternative electrode particularly adapted for sinking cavities of comparatively large area and particularly adapted for producing cavities having a curved or irregularly shaped bottom surface;

FIG. 35 is a longitudinal sectional view through the electrode of FIG. 34 and may be considered as taken along the line 35—35 of FIG. 34;

FIGS. 36 and 37 are views similar to FIGS. 34 and 35 excepting that they illustrate an alternative form of electrode;

FIG. 38 is a sectional view similar to FIG. 37 excepting that it is taken at right angles thereto, as indicated by the section line 38—38 on FIG. 37;

FIG. 39 is an end view of an electrode particularly adapted for producing a plurality of cavities simultaneously so as to leave walls of a honeycomb type conformation between the cavities;

FIG. 40 is a side view partly in section of the electrode of FIG. 39; the portion in section may be considered as taken in the direction of the arrows along the line 40—40 of FIG. 39;

FIG. 41 is a perspective view of an electrode particularly adapted for operation in confined spaces;

FIG. 42 is a longitudinal sectional view which may be considered as taken in the direction of the arrows substantially along the line 42—42 of FIG. 41;

FIG. 43 is a transverse sectional view which may be considered as taken in the direction of the arrows along the line 43—43 of FIG. 42;

FIG. 44 is a side view, partly in section, of an electrode adapted for use for the finishing of comparatively large surface areas in relatively confined environments;

FIG. 45 is a view of the working face of the electrode of FIG. 44;

FIG. 46 is a somewhat diagrammatic illustration of the manner in which the cavity produced by an electrode has a contour which is irregular with respect to the electrode under certain conditions;

FIG. 47 is a view similar to FIG. 46 but illustrating one convenient manner of overcoming the difficulty illustrated in FIG. 46;

FIGS. 48 and 49 are similar to FIGS. 46 and 47, excepting that they illustrate the same problem and the solution thereof under a somewhat different order of circumstances;

FIG. 50 is a diagrammatic side view of an adaptation of the invention for the production of a straight slot in a workpiece;

FIG. 51 is a transverse sectional view through a portion of the apparatus of FIG. 50, and may be considered as taken in the direction of the arrows along the line 51—51 of FIG. 50;

FIG. 52 is a fractional sectional view which may be considered as taken in the direction of the arrows along the line 52—52 of FIG. 51;

FIG. 56 is a vertical sectional view through a fixture according to the present invention which provides an adaptation of the invention to the problem of deburring compression springs and similar articles;

FIG. 57 is a fractional vertical sectional view through apparatus of the present invention which uses the hydraulic pressure of the electrolyte for advancing the electrode into the work at the proper rate; and FIG. 58 is a fractional sectional view drawn to larger scale showing the lower portion of the apparatus of FIG. 57.

Figure 10:
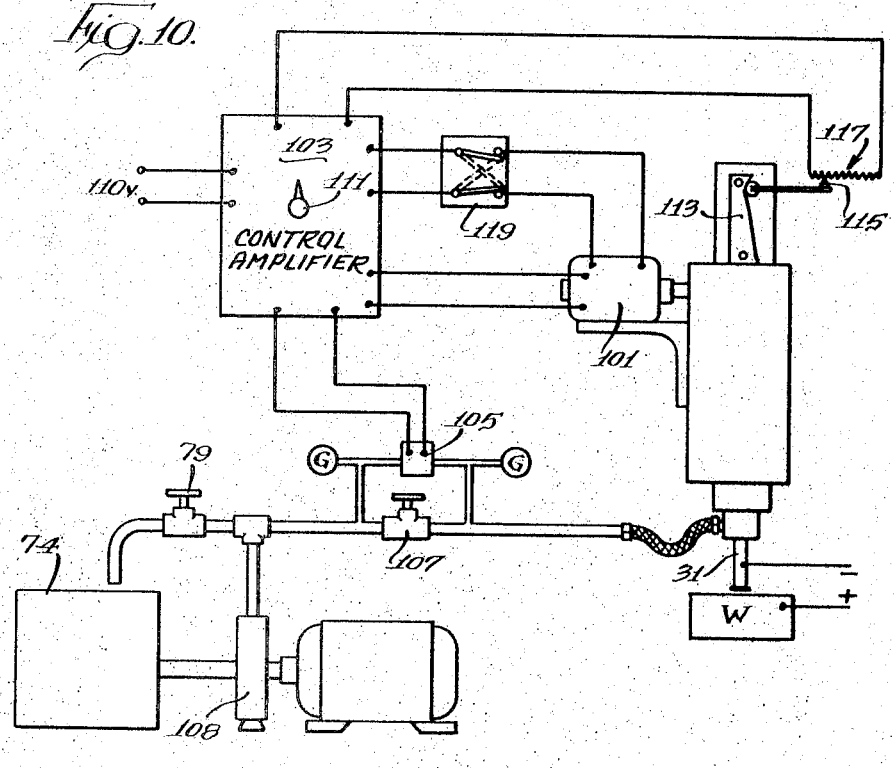
FIG. 10 is a diagrammatic representation of apparatus embodying the present invention showing one control mechanism therefor including an arrangement for controlling the speed of advance of the electrode.

Referring to FIG. 1, the apparatus of this invention includes a frame member 1 which in this case is the frame member of a conventional and well known arbor press sold under the trade name of Famco. It includes a base section 3, a column 5, and a head 7 which is adapted in the conventional manner to accommodate a ram 9 for vertical reciprocating motion. The detail of the ram mounting is not important to this invention, but it is desirable to provide adjustable gibs or the equivalent in the head so that the ram may move vertically with a smooth action and without lateral play which might introduce undesired side motion. To the bottom end of the ram 9 there is mounted a workplate 11 through which a plurality of bolt holes is provided to permit movable mounting of a work-holding vise 15.

On the base portion 3 there is mounted a metal bottom plate and on top of this a waterproof, chemical-resistant plastic mounting plate 19. This is provided with a number of threaded bolt holes to permit mounting of an electrode holder 21, which is made of suitable metal and is provided with one or more mounting slots so that it can be adjusted as to its position by selection of the suitable bolt holes in mounting plate 19.

At the working end, the electrode support member 21 is hollow and is adapted to receive an electrolyte-feed tube fitting 27 connected to a line leading to a source of electrolyte under pressure.

Extending from the upper surface, there is mounted an electrode 31, shown here as fastened by brazing to a pipe nipple threaded into the electrode support member 21. Within the hollow support member 21 the electrode is connected by a suitable passage to the feed tube fitting 27.

An electric cable is connected to electrode block 21 and supplies current from the power source. Another electric cable 35 is fastened to work plate 11 to furnish the other (normally positive) connection from the power source.

To move the work plate 11 up and down, a lead screw 37 is secured to and extends upwardly from the upper end of ram 9. A lead nut 39 is threaded upon the lead screw and is mounted between two horizontal plates 41 which are supported by four column bars 43. The lead nut peripherally is formed as a worm gear so that it may be rotated so as to move the lead screw 37 up and down. A journal plate 45 is mounted to plates 41 and carries a bearing bushing 47 which supports the outboard end of a drive shaft 49 which carries worm 51 meshed with the peripheral worm gear of lead nut 39.

The worm drive shaft is, in turn, rotated by a variable speed electric motor drive 53 mounted upon a platform 55 attached to column 5. This drive mechanism has a speed-adjusting handle 57 and a reversing handle 59, the latter having a neutral midposition as well as updrive and downdrive positions.

The sizes and proportions of the drive parts are arranged to permit adjustment in the vertical speed of movement of the work plate 11 from zero to one inch per minute. The motion must be smooth, not jerky, and, accordingly, reasonable accuracy and freedom from excessive friction are an advantage in the moving drive parts. The lead screw 37 may be protected against splatter and corrosion by a plastic enclosure 61 wrapped around column bars 43.

A conventional dial indicator 63 is shown as being mounted to head 7 of column 5 and has its working tip extended downwardly against the upper surface of work plate 11 so as to indicate relative movement as between these elements.

The entire assembly is mounted in a pan 65 which has an outlet spud adapted to drain electrolyte back into a supply sump or reservoir 74. Workplate 11 is fitted with plastic curtains 71 which can be tucked down below the level of the pan top to prevent excessive splatter.

The plumbing system comprises a low-pressure pump 73 which feeds electrolyte from the reservoir 74 through a filter 75 into high pressure pump 77, the outlet of which leads to a bypass valve 79 which may be either manually set or of the spring-loaded constant-pressure type. On the inlet side of bypass valve 79 a pressure gauge 81 is mounted. Also from the inlet side, a pipe lead is taken through a needle valve 83 to an electrolyte feed tube 84 leading to the electrode fitting 27. A second gauge 29 is connected to the feed tube 84 so as to indicate the pressure at the electrode.

In operation, a workpiece is positioned in the vise 15 above electrode 31, and work plate 11 is then driven down until the workpiece is almost touching electrode 31 as gauged by a piece of paper or shim of known thickness, say .003". The dial indicator 63 is then adjusted to zero minus the known thickness, .003" in this example. The curtains 71 are lowered, the electrolyte pumps 73 and 77 are started, and the valves 79 and 83 are adjusted so that gauge 81 reads about 120 p.s.i. and gauge 29 about 90 p.s.i. This is done while the reversing handle 59 is in neutral position. Then, simultaneously, the reversing handle is moved to down-drive position, and the electric power supply is turned on.

As the electrode approaches the workpiece, there will be a rise in pressure at gauge 29. If the capacity of pumps 73 and 77 is several times the free flow discharge rate through the electrode, the pressure upstream of needle valve 83 and of bypass valve 79 as read at gauge 81 will change scarcely at all with changes in proximity of electrode 31 to the work, for most of the flow is passing through bypass valve 79, and it is the adjustment of this which is principally determinative of the pressure at gauge 81. In short, the pumps and plumbing system up to needle valve 83 constitute a substantially constant pressure source. The same result may be obtained in many other ways. A constant pressure type pump may be used; e.g., a centrifugal pump operating near cutoff. Or a pressure regulator may be used. Or a spring-loaded relief valve adapted to maintain constant pressure may be used.

Needle valve 83, however, is set so as to constitute a sufficient restriction to flow so that when the electrolyte is discharging into the open, the pressure, as read at gauge 29, will be noticeably lower than when its outlet is restricted by being in close proximity to the work.

Thus, if gauge 81 normally reads 120 p.s.i., then when the electrode 31 touches the workpiece so as to shut off the flow, or nearly so, the pressure downstream of needle valve 83 as read at gauge 29 will rise to almost the same value, 120 p.s.i. If, however, the electrode is spaced away by several thousandths of an inch, the pressure at gauge 29 will drop, say to 90 p.s.i.

This change in liquid pressure may be used in adjusting the rate of feed of the work toward the electrode. The initial feed rate may be set at a low level (for an unknown working condition or work material), and then increased by adjustment of handle 57. Gauge 29 is observed to watch for a pressure rise which approaches that of gauge 81. It takes a little time for the pressure reading to stabilize during actual removal operations, for, inasmuch as material is being removed by anodic dissolution, it is necessary for the moving electrode to catch up with the receding work material and to establish an equilibrium spacing distance, for, as the electrode comes closer to the work, the removal rate tends to increase. By the exercise of reasonable care, it is possible to make a precise adjustment such that the electrode pressure gauge 29 reads only a few pounds per square inch lower than gauge 81, indicating that the electrode is moving forward at such a rate as to leave only a small gap between the electrode and the work.

In effect, this hydraulic system constitutes a flow meter, and the same result may be obtained by using a more formal flow meter to sense the flow rate through the gap between the electrode and work. Such a flow meter may be of any suitable sort, as for instance of the orifice type (which, in effect, uses the principle of the system just described) or of some other type; for example, that in which a moving bob is supported by upward flow in a conical glass vessel (e.g., the Fischer & Porter type).

It is not easy to measure this gap with accuracy, as apparently it is not always uniform at every point, but, as measured in a practical way, by turning off the current and advancing the electrode until it seems to bottom, the distance may be as small as .001" or less, to as much as .010" with satisfactory results, although it is preferred to work with the shortest spacing distance which can be managed without causing occasional contact and arcing between the electrode and the work, and I have found that about .002" to .005" is usually a safe distance while still permitting rapid removal of work material.

In general, low voltages and close spacing, of the order of .001" to .005" give high removal rates and low electric power costs and a higher degree of accuracy, but less striation is produced upon the side wall of the work cavity when greater spacing—of the order of .010"—is used. The greater spacing results in a lower work removal rate unless the voltage is raised however, since removal rate is a function of current. As a practical matter in most applications, I prefer to use about 10 volts and from 100 to 3000 amperes per square inch of active electrode area.

It should be noted that work material is removed by electrolytic action, not by spark or arc erosion as with the so-called electrodischarge method. This is important for several reasons, among them the fact that damaging thermal metallurgical effects on the work material are avoided and that there is virtually no erosion of the electrode. The fact that the electrode is not eroded is of great importance where the cavity is to be accurately shaped, for accurate shaping is rendered very difficult when the electrode is being eaten away at a rate rapid enough to alter its dimensions during the operation.

Thus, it is important to avoid too fast a feed rate, which may cause arcing between the electrode and the work.

Another method of gauging the feed rate is by reference to an ammeter in the electrolytic power supply circuit. Once the penetration of the electrode into the work has been well established, the rate of feed is gradually increased until an arc is observed. Usually this will be of short duration. The reading of the ammeter is observed and read just prior to the first arc, and the speed is then adjusted downwardly until the ammeter shows a reading a little below the critical point where the first arc occurred.

A transducer sensitive to either the electrolyte liquid flow rate or the electrolytic electric current may be used as the signal-generating element in an automatic feed control system.

If the electrode used is of the general type illustrated in FIGS. 3 to 7, for instance, in which the exterior surface is insulated as at 85 by a ceramic coating or the like, with only a narrow lip 87 at the exposed end, then, if the electrode is advanced at a constant rate, the cavity produced will have substantially straight sides, for the electrolytic removal on the sides of the cavity will be substantially uniform. If, however, the rate of advance of the electrode is slowed, there will be a widening of the cavity because of the longer exposure to side action. Conversely, if the rate at the beginning is slow and is then accelerated, the cavity will be narrower. By reference to the liquid pressure at gauge 29 as previously described, or to some other form of flow measurement, the penetration rate may be varied so as to produce variations in the lateral dimensions of the cavity.

A similar result may be obtained by reference to the ammeter in the electrolytic power circuit.

Referring to FIG. 8, a tapered cavity 88 may be produced by the step of adjusting the feed rate of the electrode into the work during the progress of the "cut" from a very slow rate at the outset to a rate approaching the maximum permissible. In FIG. 9, a rather startling result, the production of a reverse taper 90 larger at the bottom than at the opening, is illustrated. This is accomplished quite simply by starting with the maximum feed rate obtainable without arcing, which is then gradually reduced to a very slow rate as the cut progresses.

The ordinary taper, as in FIG. 8, may be used in such applications as the making of integral turbine blades in the periphery of a disc of super-alloy material. Since the blades to be left standing are thinner at the tips than at the root, and since the circumference of the disc is greater at the tips, it follows that the major portion of the material between the blade portions must be removed at the beginning of the "cut," with progressively less material being removed toward the root. The effect may be increased by omitting the insulation 85, or by using an imperfect insulating layer on the electrode and by eliminating the projection lip 87 at the working tip. These and other factors influencing electrode design will be described in greater detail subsequently.

The reverse taper 90 shown in FIG. 9 may be made with a cylindrical electrode and may be used where it is desired to anchor a bolt, stud, or the like. If the part 89 to be anchored is somewhat ductile, it may be driven into the reverse tapered cavity 90 with enough force to cause the end portion to flow and expand within the cavity as at 93, substantially filling it, and thus providing a very firm fastening.

FIG. 10 is a schematic illustration of one type of apparatus for automatic control of the feed rate of the electrode. Motor 101 is of the direct current, shunt wound type, and serves to advance the electrode toward the work (or the work toward the electrode) by a screw drive, all in the general manner shown in FIG. 1, except that the speed of motor 101 is varied electrically and automatically rather than manually. Other suitable mechanical configurations will be self-suggesting.

The electric supply system and amplifier 103 include rectifier circuits to provide a relatively fixed direct current voltage for the field of motor 101 and an automatically adjusted voltage for the armature so that the motor speed is automatically varied with a variation in armature voltage. The amplifier 103 derives a signal from a pressure-responsive transducer 105 arranged to respond to the pressure differential across the needle valve at 107 which is in the line between the pump 108 and the electrode 31. As one example, a diaphragm device or other pressure responsive sensing element may be mounted so that the liquid pressure differential thereacross causes a variation in pressure upon a carbon pile variable resistor 109 connected in a bridge circuit as in FIG. 11. For this purpose, however, I prefer to use a variable impedence—for example, a pressure actuated variable capacitor—in an oscillator circuit feeding the output to a discriminator to derive a control signal. As the value of the capacitor changes, it alters the oscillator frequency, and this affects the signal. All of this is conventional and well known, and needs no detailed description here.

The change in pressure is thus used to provide signals to the grid of a vacuum tube amplifier which terminates in one circuit I have used in a pair of 807 power tubes. The output tubes may be fed with alternating current from a transformer split secondary, and they thus serve as rectifiers as well as amplifiers and provide a variable direct current supply to the motor armature. The amplifier circuit is so arranged that an increase in pressure differential across the transducer element 105, which reflects an increase in the electrode-to-work spacing, causes an increase in power output, thus causing the motor speed to increase, which in turn causes the electrode to catch up to the receding work face.

Accordingly, the system serves to maintain a feed rate which is held at a level to maintain constant liquid flow in the electrolyte feed line as sensed by a constant differential pressure across adjustable orifice or valve 107. This assures substantially constant spacing between the electrode and the work. In some situations, there will be a tendency for the circuit to hunt, and anti-hunting circuit techniques may be required. Thus, the gain of the amplifier may be made adjustable as by the knob 111; capacitance with a slow bleed and a resistance feed may be connected across one of the grid circuits, etc. These techniques do not relate to the novelty of this invention and are, therefore, not described in detail, for those skilled in the art will understand how to deal with such common circuit problems.

If it is desired to alter the feed rate during the progress of a "cut," this may be provided by mounting a cam element 113 linked to and moving with electrode 31.

Figure 11:
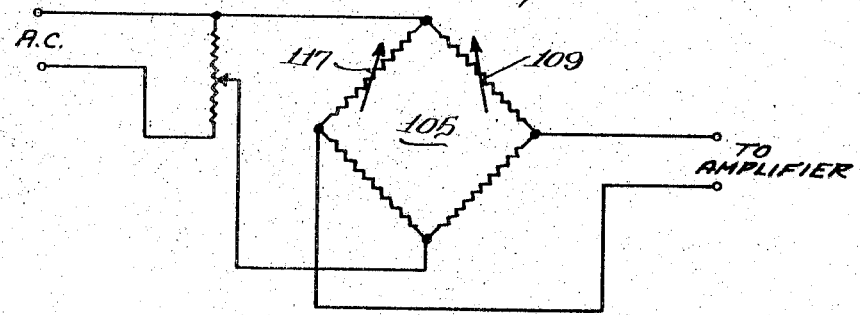
FIG. 11 is a circuit diagram of a portion of the control system of the apparatus of FIG. 10.

The cam is arranged to move the slider 115 of a variable resistor 117 (which may be regarded as any appropriate variable impedance) in circuit with transducer element 109 in such a manner as to vary the level at which signal response occurs. In FIG. 11, resistors 109 and 117 are balanced against each other in a simple bridge circuit, and should be regarded as representative of any variable impedance, whether resistive, capacitive or inductive. The cam will be shaped to alter the feed rate as desired to produce the variations in width of cavity which are wanted. It should be understood that where the transducer element 109 is not of the resistance type, then element 117 need not be a resistor. If, for example, transducer 105 is a variable capacitor, then element 117 may be a variable capacitor; or if 105 is a variable inductor, then element 117 will be a variable inductor.

The system just described constitutes a flow meter for a sensing and control device in which the flow rate range may be set for the desired response level depending upon the area of the electrode. Other types of flow meters capable of providing an electrical control signal may be used; for example, a magnetic flow meter in which an A.C. magnetic field is impressed across a nonconductive section of electrolyte feed line and two electrodes set in a plane transverse to the field. The electrolyte acts as a moving conductor in the field, and its velocity determines the voltage generated. The directly induced A.C. is cancelled out electrically, and thus a signal is derived whose voltage is linearly proportional to flow rate.

The reversing switch at 119 enables the motor 101 to run in either direction so as to extend or retract the electrode 31 as desired.

Figure 12:
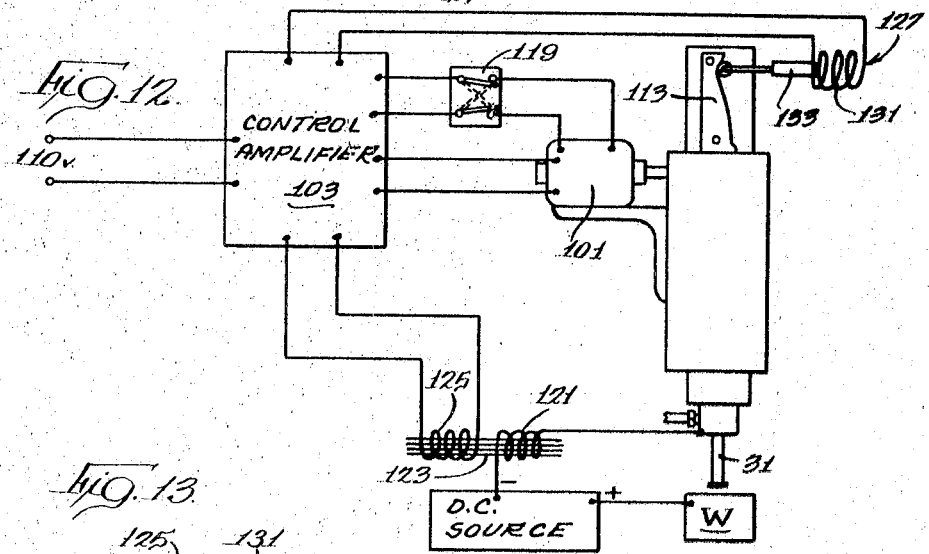
FIG. 12 is a diagrammatic representation of apparatus of the general character of FIG. 10, but showing an alternative control arrangement therefor.
Figure 13:
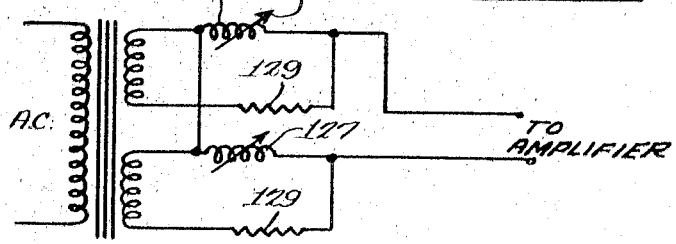
FIG. 13 is an electrical diagram of a portion of the apparatus of FIG. 12.

FIGS. 12 and 13 show an alternative arrangement to that of FIGS. 10 and 11. All parts are similar and bear like reference numerals except that the automatic feed control is responsive to the electric current passing between the electrode and the work. Variation in the current in the series coil 121 affects the saturation of the iron core 123 which in turn is reflected in a change in inductance of coil 125. This mechanism, therefore, acts as a variable inductance which can be used to modulate the output of the amplifier 103. When the electrolytic current rises above a predetermined level, the voltage to the armature of motor 101 is reduced to slow the speed of advance.

Variable speed is accomplished by the same type of cam system used in the apparatus of FIG. 10. One form of interconnecting bridge circuitry which may be housed principally within the amplifier box at 103 is shown in FIG. 13.

Variable inductor 125 responsive to current value is balanced against variable inductor 127 actuated by cam 113 in a circuit with fixed resistors 129 such that the level of amplifier response is varied in accordance with the electrolytic current in the circuit and the position of the electrode. Variable inductor 127 may be of any suitable type such as a coil 131 having a movable core 133 attached to the follower of cam plate 113.

Figure 14:
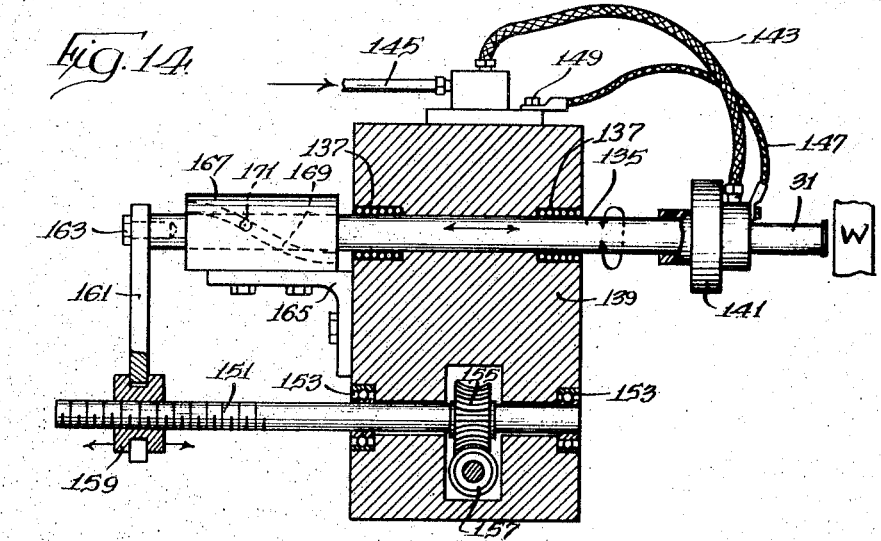
FIG. 14 is a somewhat diagrammatic sectional view illustrating apparatus for advancing an electrode with a rotary component.

Referring to FIG. 14, there is shown a sectional view, partially schematic, of apparatus for imparting a rotary motion to the electrode simultaneously with its forward motion. This may be useful in forming the interblade cavities of a turbine wheel where it is desired to impart a twist to the blades.

A ram 135 is journaled for slidable and rotary motion in bearing elements 137 mounted in a vase 139, which may be of waterproof insulating material. An electrode block 141 is mounted by a force fit on ram 135 and is arranged to mount in any suitable manner a hollow electrode 31, which may be like that of FIG. 5, for example. Electrode block 141 has a passage therethrough communicating with the hollow passage in electrode 31 and a flexible tube connection 143 leads from that passage to a heavy hose 145 supplied with electrolyte by a pressure pump. An electric flexible cable 147 connects the electrode block 141 to a terminal post 149 adapted to receive a negative power cable from a direct current power source.

Ram 135 is driven forward and back by a lead screw 151 journaled and held against end thrust by ball bearings 153. A worm gear 155 is fixedly mounted to an unthreaded portion of lead screw 151 and is meshed with a worm 157 driven by any variable speed power means.

A lead nut 159 threaded upon the screw 151 is connected to a link 161 which in turn is fastened by a bolt 163 having a threaded portion within a bottomed recess in ram 135 and an unthreaded portion extending beyond, on which link 161 is supported. Bolt 163 bottoms before clamping link 161, so that ram 135 is free to rotate with respect to link 161.

Upon a bracket 165 affixed to base 139 is mounted a cylindrical cam sleeve 167 having a cam slot 169 machined in its bore. The lead of the cam slot here shown is somewhat low for illustration. Ordinarily, a much longer lead is used, as the amount of rotation required of electrode 31 is usually only a few degrees for each inch of forward movement. A cross pin 171 is pressed into ram 135, and is adapted to register with and engage cam slot 169.

Thus, when link 161 is moved by lead nut 159 on lead screw 151 so as to advance the electrode 31 toward a workpiece W, the cross pin 171 in the cam slot 169 imparts a rotary motion to the electrode, thus giving a twist to the cavity produced. The lip of the electrode at its working tip is made to project laterally by an amount sufficient to provide clearance for the body of the electrode behind is so that there will be no interference between the wall of the cavity in the work and the body of the electrode. The pitch of the cam slot 169 need not, of course, be constant, and for some purposes the pitch may reverse. Its character will depend upon the particular work to be accomplished. The speed of advance must be established with due allowance for the lateral component of motion of the electrode's working tip, and may in some instances be substantially less than is possible for a straight cut.

FIG. 15 shows in elevation and partly in section a fluid-operated drive for moving the electrode of this invention into a workpiece.

A frame is provided consisting of a base 173, two uprights 175 and a top member 177. These are made of stainless steel and are bolted or welded together. Two stainless steel cylinders 179 are forced into bored openings in uprights 175 so that they are in parallel alignment.

Each cylinder has a hardened push rod 181 adapted to reciprocate in linear ball ways 183 pressed into counterbored ends of cylinders 179.

Each push rod 181 has a piston 185 which is pressed into position upon the rod. The piston has a series of annular grooves to serve as a labyrinth seal against excessive leakage, but no cup leathers are used as it is desired to avoid rubbing friction. Piston 185 has a radial clearance of the order of .001" to .002" relative to the bore of the cylinder.

At each end of both cylinders, there is a labyrinth seal element 187 in the form of a bushing press fitted into the bore and having internal annular grooves to reduce leakage. These also clear the push rod by a few thousandths of an inch.

Each piston-and-cylinder assembly is put together by first pressing one seal into position, then inserting the push rod with its piston already in place, then pressing the other seal in place, and, finally, pressing the linear ball ways into position, sliding them along the push rods to do this.

Seals 187 are turned down at their inboard ends, and the space thus provided beyond the piston and in communication with the cylinder is connected to the outside through threaded tube fittings 189.

The inner ends of seals 187 therefore serve the dual purpose of acting as stop abutments against pistons 185 to limit the travel of push rods 181 and also provide annular channels to permit entry and exhaust of air even when the push rods are at the limit of their stroke.

Vent holes 191 are provided at both ends of both cylinders to exhaust any blow-by of air which leaks past seals 187. The vent holes are threaded to receive tubes which are led to a position remote from the work area. This prevents electrolyte splatter and mist from entering the air cylinders where it might gum up the working parts.

Cannisters 193 enclose the back ends of the push rods to seal them against dirt and electrolyte splatter.

An electric vibrator 195, which vibrates in response to 60-cycle current, is attached to one of the uprights 175. This element is of the kind commonly used in sorting and feeding machines, and the one used here was purchased from Syntron Co., Homer City, Pennsylvania. Its purpose here is to impart a slight vibratory motion to the assembly to minimize any tendency of the moving parts to stick. Additional vibration in a plane transverse to the path of electrode motion may be used to vibrate an electrode tip to avoid pattern effects from a composite electrode, e.g., the bundle of tubes type.

At the working end of the push rods, flanges 197 are pressed onto the rods (before assembly), and synthetic-rubber telescopic boots 199 are sealed to the flanges and the face of the adjacent upright 175 by clamp rings (not shown). To the flanges 197 there is bolted an intermediate stainless steel plate 201, and to it, in turn, is bolted an insulating mounting plate 203 of Teflon, nylon, or similar material, which is waterproof and should be impervious to the electrolyte solution being used. The bolt holes should be countersunk and plugged to prevent access of electrolyte to the bolts.

To insulating plate 203 may be mounted any desired electrode holder, for holding electrode 31. Here, this consists of a stainless steel body 205 having an integral flange 207 adapted to be bolted, as shown, to insulating plate 203. The body is counterbored, leaving a shoulder 209. The electrode 31 proper is mounted to a cylindrical base 211 having an external V-groove 213. Opposite this groove in the body 205 are provided threaded holes to receive set screws 215. These are pointed, and the screw holes are so located that the points of the screws engage the inner face of the V-groove 213 so that when the screws are tightened there is a wedging action between the screw tips and the inner face of the V-groove which drives the electrode base 211 firmly against the shoulder 209. This makes an adequately sealed joint, as some small leakage of electrolyte is of little consequence.

A screw-threaded tube connection 217 is opened through the body 205 into the counterbored section, thus communicating with the liquid passage in electrode 31. A flexible tube 219 leads to a junction connection 220 for the electrolyte supply line. The top surface of top member 177 is one convenient location for such a junction connection. Similarly, as shown in FIG. 15, a flexible electrical cable 221 is led from flange 207, to which it is bolted, to a suitable junction for connection to the main power supply cable from the power source. Alternatively, a heavy copper strip 200, shown in FIG. 15a, could be bolted at one end to the flange 205 and arranged to extend outwardly and thence rearwardly for connection to the end of the cable 221. It is convenient to do this by carrying cable 221 to a metal junction member 222 mounted on an insulating block 224 atop top member 177 and in front of the liquid junction previously referred to.

Both tube 219 and electric cable 221 must be quite flexible so as not to interfere with motion of the electrode, and enough extra length must be provided so that there is not much change in force exerted by or against these members during motion of the electrode.

A dial indicator 223 is mounted on a suitable bracket 225 with its stem 227 extending forward through guide 229 on the side of rear upright 175. The stem is engaged by a push rod 231 fastened by screw threading into intermediate plate 201 near its adjacent edge so that the push rod passing through a guide 233 on the forward upright 175 engages stem 227 to which it is attached by a friction fit rubber collar 235, thereby permitting elimination of the retracting spring in the indicator assembly, which otherwise interferes with proper balance of the forces involved in the system.

FIG. 15a shows the above assembly mounted for work. The assembly of FIG. 15 is mounted by its base member 173 to a stainless steel plate 236, which in turn is set within a stainless steel pan 237. Both are mounted on a stand (not shown). A transparent plastic enclosure (not shown) covers the work area, its back wall being notched for boots 199 and for push rod 231 and provided with openings for tube 219 and cable 221. The enclosure rests on short legs to lift it above the bottom of pan 237 but it still extends well below the pan's upper edge. Thus, ventilation is afforded to the work area, but splash is retained within the pan. A powered exhaust blower (not shown) may be connected to the enclosure by a suitable duct, and thus all fumes may be drawn away from the operator.

The work 239 is mounted on a suitable pedestal 241 in front of the electrode 31 and is positioned so that the cavity to be formed will be in the desired position in the work. In a typical situation, a rotary indexing table may be mounted to hold a disc of super-alloy material so that its edge is toward the electrode in close proximity to it when the electrode is retracted. Then, the electrode is advanced to "cut" a cavity constituting the interspace between two turbine blades. The electrode is then retracted, the disc is indexed to the next interspace position, and the operation is repeated. By progressing around the disc in this way, a full set of turbine blades is provided, all integral with the remaining central portion of the original disc.

Turning to FIG. 16, there is shown a schematic diagram of the hydraulic (electrolyte), air, and electrical hookup of the apparatus of FIG. 15. An air supply line 243 leads through a filter 245, a pressure regulator 247, an oil bath 249, and thence to a valve 251 actuated by a solenoid 252 controlled by push-button controls (not shown) which actuate switch 254 in a convenient location. From the solenoid valve, tubes 253 and 255 lead to the two air connections 189 on each cylinder, which are connected together in the same sense at each end. The solenoid valve is of the type (and is so connected) that, when deenergized, the valve takes the position to send air under pressure through line 253 to the cylinders in a direction to cause retraction of the electrode. Thus, in the event of accidental power failure, the electrode moves away from the work instead of the opposite. As a safety device, the solenoid valve control circuit is interlocked with an adjustable pressure switch 257 in the electrolyte supply line so that if the electrolyte falls below a predetermined level the solenoid electrical supply is cut off, causing retraction of the electrode. The electrical control circuit for the solenoid valve as shown includes the on-off switch 254.

The electrolyte supply is fed from a reservoir 259 by a pump 261 capable of supplying the requisite amount of electrolyte (depending on electrode area) at a pressure of from 100 to 200 p.s.i. The electrolyte then passes through one or another form of pressure regulator 263 (which may be essentially a manually controlled bypass valve) to a first gauge 265, through a needle valve 267, then to the actuator 269 for the pressure switch 257, then to a gauge 270, and thence to the junction block 220 on the top member 177 of the assembly of FIG. 15a, and then through tube 219 to the electrode holder, and so into the electrode. It has been found that the system works more smoothly and with complete freedom from hunting when needle valve 267 is connected to the electrode through a length of four to eight feet of neoprene hose which, being slightly expansible, seems to provide a kind of damping or smoothing action. A thermometer 271 is mounted in the junction block 220 to indicate the temperature of the electrolyte. From the electrode, electrolyte falls into the pan 237 and is returned to the reservoir 259.

The electrolyzing current is fed from the direct-current source to the work by a heavy cable, usually by connection of the positive terminal to the work pedestal or holder or to a stainless steel base plate (not shown). The other (negative) supply cable leads to a junction on an insulating block 224 on top member 177 as previously explained.

Vibrator 195 is connected to the power input line to the solenoid valve coil 252 so that the vibrator is energized whenever the solenoid valve is energized so as to be in position to cause the electrode to advance toward the work.

The mode of operation is as follows. After the work is positioned, the electrolyte supply pump is energized, and the control button is pushed to advance the electrode against the work. Air pressure acting on pistons 185 urges the electrode toward the work, while hydrostatic pressure of electrolyte at the electrode tip tends to force it away. By regulating the needle valve 267 in the electrolyte supply line, a restriction is established such that when the electrode is very close to the work the pressure rises because of the narrow gap for exit, but when the gap widens the pressure immediately drops. Thus an equilibrium position is reached at which the forces exerted, respectively, by the air on the pistons and the electrolyte on the working tip of the electrode are balanced. This balance may be adjusted, by adjustment of air pressure and of the needle valve, so that the equilibrium is reached at any spacing from .001", or even less, to .012" away from the work. This can be checked by observing the dial indicator 223 and pushing the electrode forward manually until it bottoms against the work. All of this adjusting and checking is done without any electrolyzing current. When these conditions have been appropriately established, the current is turned on and immediately the indicator will show the advance of the electrode into the work. As the electrolytic action dissolves away the work material, this tends to open the exit gap between the electrode and the work, thus tending to reduce the hydrostatic back pressure so that the air-actuated piston moves the electrode forward into equilibrium. In actual operation, this occurs very smoothly, and one sees on the dial indicator only a smooth, steady progress. If the work is stopped, by turning off the electrolyzing current, at any point, it will be found by advancing the electrode manually until it bottoms, the predetermined spacing distance will be maintained with high accuracy.

It is not necessary that air be used to advance the electrode. Any other fluid medium under pressure will be satisfactory.

I have also successfully used a coil spring 272 as shown diagrammatically in FIG. 17, instead of the air-driven piston for driving the electrode. The spring should have a rate as close to zero as is reasonably possible for best results, and this limits the length of stroke which can be obtained without readjustment except by use of rather elaborate spring devices or quite long springs. However, the spring arrangement gave good results for short strokes and is a simple and practical alternative. The principle is the same; the hydrostatic force pushing the electrode away from the work is balanced by a more or less constant force of the air or spring in the other direction, so as to maintain an equilibrium at a position of the electrode close to the work.

By this arrangement, a close and constant spacing between electrode and work is maintained without servo systems and with a minimum of complication and cost.

A simple form of feed device may be made for making simple holes where low cost may override considerations of accuracy, versatility and reliability found in one of the more complex forms of the invention. This form is shown in FIGS. 57 and 58.

In this simple form, the hydrostatic pressure of the electrolyte itself is used to advance the electrode into the work.

Referring to FIG. 57, a cup-shaped cylindrical metal body 481 having a central cylindrical cavity or chamber 483 is fitted with a removable, screw-threaded cap 485 and a sealing gasket 487. The upper end of cap 485 terminates in a screw-threaded pipe nipple 489 to which an electrolyte supply line from a pressure pump (not shown in this figure) is to be connected. A central aperture 491 through nipple 489 is arranged to admit electrolyte to the central chamber 483.

Body 481 has a cylindrical opening 493 at one end which is slightly larger than the largest electrode carrier shank which is to be used. Within the central chamber 483 of body 481 there is positioned a bushing 495 of Teflon or other similar material. This bushing may conveniently fit finger tight within body 481 and should be substantially liquid-tight therein but without being so tight in the chamber as to prevent easy removal when changing sizes of the electrode carrier.

The bushing 495 has a plurality of annular grooves 497 the purpose of which is to prevent excessive bypass leakage around the shank 499 of electrode carrier, which is arranged to slide freely in the bushing. Where the tip of the electrode 503 is round, the shank 499 may be round, and the bore of bushing 495 likewise. But where the tip is of some irregular shape, the shank requires a key to be machined on one side, and the opening in the bushing is provided with a matching key slot to prevent accidental rotation of the electrode. Other antirotation expedients may of course be substituted, such as a simple guide for the portion of the tool carrier beyond the cylinder.

The electrode tip must have an area (measured to its extreme perimeter) which is slightly larger than the effective cross-sectional area of the shank 499. The electrode tip is made in the manner previously described, and the electrode above the tip is coated with ceramic as previously discussed and at its upper end it is secured to the lower end of the shank 499.

A passage 509 for electrolyte is provided through the central portion of electrode 503, its shape and size being suited to the electrode tip shape. If the tip is round, square, or hexagonal, for example, the passage may be round. If the tip is of crescent shape (to form interblade spaces for a turbine wheel, for instance), then the passage may be of some more convenient shape.

This passage through the electrode communicates by way of a passage 511 through the shank 499 of the electrode holder with the chamber 483 and the flow rate or pressure drop through the passage 511 is adjusted by a conveniently located needle valve 513.

A flexible electrical connection 515 leads from the body to the electrode holder 501 where it is secured by a terminal 517 and terminal screw 519.

A direct current power source is then connected between the lead 515 and the holder 521 for the work W, the positive connection going to the work or the vise or fixture therefor.

The complete electrode drive assembly is then mounted by any suitable means to bring the electrode 503 in working relationship to the work, and the work is held by a vise or clamp or fixture. The work area is then enclosed, preferably by movable screens or curtains of transparent material, so that it is easy to see and have access to the work area while still being protected from the considerable splatter of electrolyte during operation.

The electrolyte pressure source should, for convenience, provide, adjustably, from 50 to 200 p.s.i. of electrolyte pressure, although, as will appear presently, this is not essential, and the work area should be cupped and drained so that electrolyte is returned to the supply tank. This arrangement is adequately shown in other figures and is believed clear enough as not to require repetition in this drawing.

In operation, the work is positioned such that the electrode tip is near the work surface with the electrode in the retracted position.

Electrolyte pressure is then turned on, and as the liquid enters the chamber 483 in body 481 it forces the electrode holder shank 499 outwardly toward the work as the shank 499 acts as a piston. But as the tip of electrode 503 almost engages the face of the work, a hydrostatic pressure is built up between the tip and the work face, and this pressure produces a force tending to push the electrode away from the work. Since the area of the tip was deliberately made greater than the effective cross-sectional area of the shank 499, the tip can never touch the work face in such a manner as to seal off the flow entirely, for, as the tip moves closer and closer to the work, the flow of liquid is pinched off so that liquid pressure between the tip and the work approaches the pressure in the chamber 483, acting upon shank 499 as a piston. But, before the liquid pressure under the electrode tip equals the pressure in the chamber 483, the force acting upwardly against the tip equals the force acting outwardly on shank 499, and an equilibrium position is reached with the tip in very close proximity to the work but not touching it.

At this point, the electrolytic current supply is turned on, and the full coaction of all the elements—pressure pump, electric power source, electrode tip, electrode shank, etc.—comes into play. Through electrolytic action, material is removed from the work under the electrode tip. This increases the space between the work and the tip, and the hydrostatic pressure at the tip tends to fall, but the instant this work gap pressure falls, the hydraulic force on the shank 499 exceeds the upward force on the tip, and so pressure generated by the pump moves the electrode downwardly to a new equilibrium point. This occurs as a continuous motion, thereby maintaining a desirably small work gap to maximize the electric current which can be passed at a reasonable and modest voltage.

The orifice constituted by the needle valve 513 in the passage 511 through the electrode shank permits fine adjustment of the work gap distance, and this is desirable because, in practice, it is not easy to maintain an exact area of the electrode tip, particularly if it is of an irregular shape. By reducing the needle valve opening so as to impede electrolyte flow through the electrode, the tip must move closer to the work in order to develop a back pressure sufficient to exert an upward force on the tip equal to the downward force on the shank. Thus, reducing the needle valve opening results in closer work gap spacing, while opening it has the opposite effect. This eliminates what might be a troublesome problem, namely the balancing of areas of tip and shank to secure just the work gap desired. All that is needed is that the tip area, whatever its shape, be a little larger than the cross-sectional area of the shank, and the needle valve will permit the rest of the adjusting.

Adjustment may also be accomplished by changing the applied electrolyte pressure. At lower pressures, a smaller work gap will result and vice versa. While this might be relied upon alone in a very low cost embodiment of the apparatus, it could introduce some problems, as changes in pressure may affect electrolyte temperature and gassing in the work gap, thereby affecting size, finish, etc. In most cases, therefore, it is better to select a more-or-less fixed working pressure and to make adjustments in other ways such as with the needle valve 513.

This form of the invention (FIG. 57) permits construction of very low cost apparatus, and may have special value in the extraction of broken taps. A range of sizes of electrodes and matching insulating bushings 495 is provided for ready interchange. One great advantage of this system (as is also true of the other forms of the invention) is the fact that there is very little, if any, wear or erosion of the electrode, whereas in the so-called "tap busters" of the prior art in which there is arcing between the electrode and the work, the electrode is worn away at a substantial rate and is a substantial factor in overall cost.

The electrodes used in this invention are of considerable importance to successful operation.

FIGS. 3, 4, and 18 illustrate a form of electrode for making simple cavities. The electrode generally designated by reference number 31 may be made of a copper body 275, although stainless steel or titanium are better for most purposes, since they have less tendency to acquire plating deposits. It has a central passage 277 and, at the working tip 279, is a flange or laterally extending lip 281. In practice, this lip may project beyond the body 275 by about .010" to .030" or more. In the axial direction, the thickness of the lip may be from .010" to .030" or more, but I prefer to make it about .020" to .030". The lip may taper in thickness so as to have a much thicker section near the body and quite a narrow section at its extremity. The purpose in keeping the lip thin is to minimize the area exposed in such a way as to minimize side action; that is, the removal of material from the sides of the cavity as the electrode penetrates the work.

Some amount of side action seems unavoidable, but the use of a narrow-edged lip holds this to a minimum value, and, moreover, helps to keep the amount of side action fairly uniform so that the side walls of the cavity can be kept straight and so that cavities of the same size can be produced repetitively. I find that side action can be easily held to about .005" (.010" on the diameter) and reproducibility can be held to within a few thousandths of the given dimension. Accuracy is dependent not only upon the electrode but on holding a constant feed rate, constant electrical voltage, and constant temperature of electrolyte. A cooled heat exchanger may be installed in the electrolyte tank to hold the electrolyte down to a predetermined temperature. Pumping against a bypass restriction will have the effect of raising the electrolyte temperature appreciably. Additionally, immersion heaters with thermostatic control and other well known expedients may be used to maintain the desired temperature which, for good chemical reactivity is preferably within the range of 120° F. to 160° F. at the input to the electrode.

Further, with respect to electrodes, and with reference to FIG. 4, the body 275 of the electrode is coated with a ceramic or vitreous enamel layer 283 which is better for this purpose than any organic coating I have found. For this purpose I have used ceramic oxide frits of the kind commonly used for decorative enameled jewelry, or of the kind used for protection of electrical resistors of the heavy duty type. The frit is mixed with water and ager to make a creamy suspension, which is applied to the electrode body with a spray gun. Then the electrode is placed in an oven or kiln and fired to 1500° F. to 1800° F. or whatever is required to fuse the particular frit being used. The enamel layer 283 which is thus formed should be free of discontinuities, and it may be necessary to apply one or more additional layers to insure this. The coating should be reasonably uniform in thickness and should not extend sidewardly beyond the projection of lip 281, for, if it has humps which extend too far, they will bump the side wall of the cavity as the electrode advances and deflect the electrode sideways, which may produce a crooked hole or cause the lip 281 to strike the side wall of the cavity, causing a short circuit and arcing, with consequent possibility of damage both to the electrode and to the work.

The purpose of the enamel coating is to utilize its insulating properties to minimize electrolytic side action between the electrode body and the side walls of the cavity. In some instances, however, where the lip 281 extends a substantial distance, this insulation is not required, and very little side action is observed without it. The explanation for this is believed to be as follows. When the electrode tip is in close proximity to the frontal working face of the work, the gap for the escape of electrolyte is only a few thousands of an inch. Thus the electrolyte existing under the tip under substantial pressure has high velocity as it enters the much larger space behind the tip. With a small amount of electrolyte at high velocity many discontinuities are created so that electrolytic conduction to the side walls is impaired sufficiently to prevent substantial removal of material and, in addition, it is possible to operate at a high enough voltage and current density so that electrolyte in the narrow work gap is heated above its normal input temperature, between 120° and 160° F., and also, some gas is evolved.

Within the confines of the work gap, however, the liquid is held under a relatively high pressure of several atmospheres so that its boiling temperature is considerably elevated. I have commonly used electrolyte pressure of the order of 100 p.s.i. gauge. When the liquid passes beyond the lip 281 into the relatively open space behind it, there is, in the first place, not a very high mass flow because of the restriction of the narrow work gap, but the liquid has high velocity because of the pressure and can be observed to foam as it exits. It is conjectured, therefore, that the electrolyte in the space between the body 275 and the wall of the cavity as it exits at high velocity from the work gap becomes almost instantly full of discontinuities due to gas bubbles either from boiling or electrolytic decomposition in the work gap or both, so that conductivity from the body 275 to the side wall is quite poor.

Whether or not this is the explanation, the fact is that in cavities up to an inch in depth there does not seem to be much side action when a lip of substantial protrusion is used. Notwithstanding this, it is preferred to use an insulating coating, as the finish on the side walls of the work seems to be better in most cases when this is done.

Vitreous enamel is the best coating I have found, but other insulating materials may be used. I have found Teflon quite satisfactory where it can be easily applied. However, the organic lacquers and paints which have been tested have not been very satisfactory because they seem to be chemically or physically attacked near the working tip. The vitreous enamel seems to be quite impervious to such deterioration.

Copper is a good substance for forming the electrode because it is a good electrical conductor, but good success has been had with cold-rolled steel. Brass may be used, but it is difficult to get a good vitrified enamel coating on brass, and, accordingly, it is not preferred. All of these materials are, in general, somewhat less satisfactory than stainless steel or titanium in that they are susceptible to the formation of plating deposits which, under some conditions, may make the outline of the electrode less clean, and in some instances such deposits may change the current flow characteristics of the system.

Where it is desired to sink a cavity at an angle—as, for example, in making rectangular slots through a piece of work material at an oblique angle—it is necessary to modify the working tip of the simple electrode as shown in FIG. 19. The tip 279 is secured to the electrode shank or body 275 at an angle so that the end face lies flat against the starting surface so as to cause electrolyte to exit relatively equally in all directions. If the surface of the work is irregular so that good initial contact cannot be achieved, reversing the current for a short period so as to deplate the electrode into uniform contact with the work will result in an effective seal.

Whenever an electrode of the type shown in FIGS. 3, 4, 18, or 19, for example, breaks through the remote side of a workpiece, there may be difficulty if the remote side is not precisely parallel to the plane of the electrode tip. In fact, this is true of any electrode used for piercing a through hole. The difficulty is threefold.

First, if the breakthrough occurs at one place before another—which is more likely than otherwise—the electrolyte will tend to flow out through the opening thus created, and, when the first opening is large enough, all of the electrolyte will exit through it and none will be present between the unpierced portion of the work and its opposing portion of the electrode tip. Accordingly, if the electrode is advanced further toward the work, it will make mechanical contact and cause short-circuiting.

Second, if the feed mechanism is of the type controlled by hydrostatic pressure in the electrolyte supply line or by electric current in the electrolytic work circuit, the initial breakthrough will cause a drop in electrolyte pressure at the electrode and in electric current, and the result will be that the feed rate will be increased by the false signal, and this too will cause short-circuiting.

Third, in hole-piercing operations it is common to use a simple, thin wall, hollow electrode and to allow a projection 285 of the work material to remain within the electrode, as shown in FIGS. 20, 21, and 22 for instance, and where the hole is not large, it is common not to insulate the interior wall of the electrode; although, where the electrode is large, this is done (as shown at 287 in FIG. 18a) to reduce current consumption. It is also done where it is desired by a trepanning operation to form an accurate, untapered shape on the work within the electrode, this portion thereby becoming the finished workpiece, or an integral portion thereof.

If no preventive measures are taken, this projection 285 may cock to one side when the electrode breaks through the remote side of the workpiece. This occurs where the breakthrough occurs almost simultaneously around the perimeter of the electrode tip but still leaves one thin and small point of attachment weak enough to bend and allow the projection within the electrode to swing over and make contact with the inner wall of the electrode, thus causing a short circuit and causing a burn off through the small, thin, remaining area of attachment.

To overcome these difficulties, a dummy workpiece 289 (see FIGS. 20, 21, and 22) is fastened on the remote surface of the workpiece W by gluing with a water soluble glue. Waterglass (sodium silicate solution) is inexpensive and has been found suitable for the purpose. As a precaution, the dummy workpiece is mechanically clamped as by the C-clamp 291 shown in the drawings. As the electrode 31 advances from the position shown in FIG. 20 thorugh the workpiece proper, as shown in FIG. 21, it exposes and the electrolyte dissolves the glue beneath the edge of the electrode so that the electrode penetrates into the dummy workpiece, as shown, but the projection 285 within the electrode remains glued to the dummy workpiece 289. Penetration of the electrode into the dummy workpiece should be carried far enough to assure straight side walls of the cavity in the work, but should not be prolonged unduly as the glue holding the projection 285 to the dummy workpiece will gradually dissolve and release the projection, which then rattles around within the electrode, causing intermittent short-circuiting. While this does not harm the work, it does roughen and erode the wall of the electrode, and should be avoided.

A variant arrangement somewhat easier to apply is shown in FIG. 22. A plastic sponge 293 is held by support member 295 against the remote side of the workpiece W. The support member may be held by C-clamps 291, as shown, or in any other suitable manner. The sponge should be thick enough and resilient enough to permit the working tip of electrode 31 to be pressed down into it as it passes through the workpiece. Yet it must be firm enough to offer resistance to the passage of liquid through it. Thus, if upon breakthrough, an opening occurs at one point before another, there is no free exit of electrolyte, and the remainder of the electrode tip continues to be supplied with electrolyte so that all of the necessary material is removed electrolytically, thus providing a clean and sharp opening. The one negative aspect of this variant is that, if the electrode penetrates too far or for too long a time beyond the workpiece, there may be some unwanted electrolytic action between the electrode tip and the face of the remote side of the workpiece. This may be minimized by going only as far as needed for a clean breakthrough, but it is avoided almost entirely by the arrangement and procedure of FIGS. 20 and 21.

Any other sufficiently resilient material, such as soft rubber for instance, may be used in place of the sponge 293, so long as it provides a seal and permits slight electrode penetration.

In lieu of backing the work material either with a metal plate or a soft, resilient material, it is possible also to provide at the back or exit side of the workpiece a closed chamber which is completely filled with electrolyte. When this is done, then, as the electrode first breaks through the workpiece, the electrolyte which would otherwise tend to flow entirely through the first opening cannot do this because the chamber backing the workpiece is already full of electrolyte. Accordingly, there is no low resistance path for discharge of electrolyte. Instead, the electrolyte must continue to flow under the tip of the electrode between the electrode and the workpiece, returning along the electrode as was the case during the portions of the "cut" prior to initial breakthrough. This alternative method of securing a clean breakthrough is of particular advantage where the workpiece is of such configuration that it is not easy to gain access to the back or exit side, as, for example, when the workpiece is itself a closed or substantially closed vessel.

Where the workpiece constitutes the shell of an enclosure, then all of the openings in it may be closed or plugged in some suitable manner, and the cavity completely filled with electrolyte. Where this is done, it is preferable that the electrode be mounted in such a way relative to the workpiece that the hole or cavity to be made is not at the highest point of the workpiece, for there may be difficulty in assuring against bubbles in this area. It is preferable, therefore, to arrange the work and the electrode so that the hole to be made is in a position well below the highest point of the work, while at the same time taking care to fill the cavity as nearly completely as possible to avoid the resilience of excessive pockets of air or other gaseous material.

In FIG. 23, another variant of the electrode is shown. Here the tip 297 is made of tantalum, and is fastened by welding, brazing, or swaging to the electrode body 275, which may be made of any suitable less costly material. The special utility of the tantalum tip is that it permits the use of an alternating current electrical supply system, readily and cheaply available without rectification. All that is needed is a simple stepdown transformer. If an acidic electrolyte is used, the tantalum will pass current when it is a cathode (−) but not when it is an anode (+). Thus, current will pass in a direction suitable for removing work material but will not pass in a direction to attack the electrode.

The inner and outer walls of the body 275 are coated with ceramic 283 or other insulating material so that they will not be attacked by reverse electrolytic action. The tantalum electrode permits a very inexpensive apparatus, although, since it works only on the half cycle, its removal rate is not as great as that of the direct current system. However, where a large number of cavities is to be made simultaneously, a plurality of tantalum-tipped electrodes may be used, and, where the workpieces are separate, the alternating current electrical connections are so made that half of the electrolytic work cells are connected in one sense and the other half in the reverse sense, so that both halves of the alternating current cycle are substantially equally loaded.

Other tip materials may be used for other purposes. Thus, the tip may be plated with black platinum to increase its effective electrical area to diminish cathode losses. Tungsten or silver tungsten may be used to minimize electrode damage from accidental short circuiting. Silver may be used where its higher conductivity will be helpful, particularly where the electrode is small and necessarily has thin sections which might offer substantial electrical resistance if made of poor conductors, such as stainless steel or steel, and where even copper might tend to be heated excessively.

Referring to FIG. 24, there is shown a simple apparatus used to impart a high spectral finish to the walls of the cavity. Around the electrode 31 there are placed one or more synthetic rubber gaskets 299, such as the two O-rings shown. These are soft enough to seal against the face of the work W and are formed to fit closely the contour of electrode 31. A clamp plate 301 is mounted to a pedestal 303 at one end and has a clearance opening 305 to surround the electrode at its opposite end. A stud 307 passes through a central clearance hole in the clamping plate, and is fitted with a wing nut 309 by which the clamping plate 301 may be bent downwardly to clamp and compress gaskets 299 so that they seal against both the face of the work and the body of the electrode. The clamping pressure is adjusted to permit escape of electrolyte which is pumped through the bore of the electrode at a pressure of say 100 p.s.i., but yet holding the electrolyte under some pressure after it passes the lip of the electrode. The electrode is insulated by enamel, as previously described, and is advanced into the cavity, preferably by a positive mechanical drive which is not influenced in its rate of advance by the friction of the seal.

Under these conditions with most electrolytes suitable for the particular work material involved, the side walls of the cavity show a bright, lustrous finish characteristic of electropolishing. This is quite surprising, for the generally accepted theory of electropolishing presupposes a stagnant viscous layer of complex salts of the work material lying in the low areas and insulating these while the high points are removed. Yet, here, high velocities and great turbulence are purposely encouraged and produce the desired result with great rapidity even though this appears to be operating counter to accepted theory.

As a typical example, a cavity was sunk in a piece of super-alloy material AMS5537, sometimes designated L605 or Stellite 25. Its composition is given as follows:

20% Cr, 10% Ni, 15% W, balance Co

Electrolyte consisted of the following in 15 gallons of tap water:

|  | Oz. |
|---|---|
| Potassium nitrate | 23.3 |
| Rochelle salt | 13.3 |
| Sodium nitrite | 18.6 |
| Potassium chloride | 28.0 |
| Calgon Banox | 4.8 |

Another surprising aspect of this process is that it has been said by scholars and experimenters in the electropolishing field that complex alloys cannot be successfully electropolished. Obviously, this material is of just the kind which has generally been thought unsuitable.

As a variant means of utilizing the electropolishing action just described but without sinking a cavity, the apparatus of FIG. 25 will serve as an example.

A tube 311 of copper is plugged at both ends with insulating bushings 313. Into the upper one of these is threaded a tube fitting 315 to which an electrolyte conduit leading from a pressure pump (not shown) is connected. Into the other insulating bushing is pressed a workpiece W, here shown as tubular. Electrolyte then enters through the fitting 315 into the pressure chamber formed by the copper tube 311 and its end bushings 313, and exits through the bore of the tubular workpiece. While this is one form of apparatus tested, there is no requirement or preference for exhausting the electrolyte through a tubular workpiece. For other shapes of workpieces, an exhaust orifice or valve may be used, and this may be connected into the insulating bushing opposite the inlet connection or, if convenient for spacing, in the same end as the inlet fitting, but the inlet and exit and the size of the chamber should be arranged to cause great agitation and high velocity over the workpiece.

Here the workpieces consisted of 18-8 stainless steel hypodermic needle tubing having an outside diameter of about .067", and an inside diameter of about .020". These were inserted through a tight hole bored in the lower insulating bushing. The small bore of the tube served as an outlet orifice and permitted developing liquid pressures of the order of 100 p.s.i. to 150 p.s.i. in the chamber.

The copper tube was connected to the negative pole, and the workpiece to the positive pole of a direct-current power source.

At a potential of 15 volts, a preliminary polish was obtained in six seconds, and a good polish in ten seconds. In the former case, the diameter of the tube was reduced about .001". In twelve seconds the diameter was reduced by more than .002".

The solution used was that just above described. However, other solutions, including many (like the one used) not ordinarily regarded as electropolishing agents, yield similar results. For example, simple 20% solutions of sodium chloride or potassium chloride yield similar results. Apparently, in addition to the high turbulence and high velocity, the principal requirement is that the solution be of high conductivity and reasonably high ion mobility. However, rust-inhibiting agents, such as sodium nitrite, seem not to be harmful on super-alloys or stainless steel, nor are complexing agents such as salts of the formic acid series.

The material referred to as Calgon Banox in the solution described above is a proprietary product of Hagan Chemicals & Engineering Co., Pittsburgh, Pa.; ordinarily used to prevent rust corrosion. The material is described as hexametaphosphate salts, and the particular formulation used in the above solution is designated by Hagan as Banox 7-RS. This material cannot be used successfully in any solution for working ordinary steel, nor can sodium nitrite. It appears also that for ordinary steel materials, alkalinity in the solution should be avoided.

It is believed that the electropolishing action may be caused by relatively high velocities and pressures over the work surface. The high velocities may tend to reduce the polarizing or passive film which is always tending to form on the anode at high current densities. But this reduction in thickness of the anodic film is much more marked on any protuberance or minute point of the surface, and much less marked at any depressed portion, thus tending to attack the high points more rapidly. It has been proposed to use rotating discs as cathodes, but there are severe limitations on the practical usability of this means of attaining high velocity in the electrolyte. For example, many irregular shapes of work can scarcely be approached to a rotating member in a uniform manner. But, so far as I am aware, the use of high pressure pumping to attain high velocities for electropolishing is new. With the high velocity, the use of pressure of several atmospheres permits operating at current densities which might cause excessive gassing and even boiling, which, of course, prevents good polishing. So far as I am aware, it is new to use high pressure in an electrolyzing system to permit attainment of high current densities either for electropolishing or for rapid mass metal removal.

Referring back to FIGS. 3, 5, and 6, previously mentioned, there are shown in end view three variations of contouring electrodes for rough-forming interblade spaces of turbine wheels of the integral blade type. Each view shows a cylindrical electrode mount 211 and a formed lip 281 shaped to the desired outline. The tube body of the electrode 31 is hidden behind the end portion, and the dotted lines which would indicate its position have been omitted to avoid confusion. Suffice it to say that the tubes 275 are formed to the general shape of the desired contour but reduced in dimension so that all parts of the tube lie within the outline of the outer edge of the lip 281, as previously explained. The exterior of the tube, at least, is preferably coated with insulating material 283 such as vitreous enamel.

In FIGS. 3 and 4, the opening 277 in the tube appears as a single, curved slot, and, ordinarily, this is what is used if speed of removal of work material is the primary consideration. A copper tube is rough-shaped to the desired contour; then the lip 281 is made by peaning or swaging the end of the tube in a die. Then the lip is filed accurately to the desired shape. The opening in the tube is carefully faired out by filing to make the width of the lip as nearly uniform as possible and preferably not more than 1/16" to 1/8" wide from the faired opening to the extremity of the lip.

The electrode of FIG. 3 will leave a ridge of work material extending up into the slot opening. If desired, this may be eliminated by brazing a thin copper bottom plate 317 to the working tip as is illustrated in FIGS. 5, 6, and 7. This plate has numerous small holes 319 about .030" in diameter as in FIG. 6, or fewer larger holes as in FIG. 5, and serves to remove work material electrolytically which would otherwise extend up into the tube. The bottom plate is shaped to the shape of the lip. No holes are in the edge areas of the bottom plate, as these might cause an irregular flow pattern and consequent channeling in the work.

Instead of a copper bottom plate with holes, it is also within the purview of the invention to use a porous metal element 321 shaped to fit snugly within the slot of the electrode as shown in FIG. 26. Or a formed metal screen element may be inserted in this manner. The central idea is to place a metallic electrode surface across the open slot, leaving a small pattern for the passage of liquid but eliminating any large open area. It is best, however, if the central portion of the electrode is recessed somewhat so as to be behind the electrode end as is best seen in FIG. 7.

FIG. 26, previously referred to, shows in section an electrode end in which a porous metal member 321 has been fastened by rolling the tube body 275 into an annular groove in the porous metal element, which is also shaped to form a working lip 281. Ceramic coating 283 is then applied to the exterior of the electrode.

This electrode is suitable for small areas, but I have found that when the diameter of a porous metal type of electrode tip is as large as 1", the work is left with radially extending grooves probably caused by liquid exiting irregularly from the mid-area of the tip. The path from the point of introduction of electrolyte to the point where it leaves the active work area should preferably be kept short, and I prefer to keep this distance under 1/8" to 1/4".

It is a part of the inventive idea to give attention to means for allowing the electrolyte to escape without first traveling a long distance in the electrolytic field between the electrode and the work. A number of means of doing this with consequent opportunity for performing very useful and unique work is illustrated in the following exposition of several different types of shaping electrodes. The purpose, in part, is to permit not only the formation of cavities of a desired cross-sectional shape, but also the formation of cavities having shaped compound contours in three dimension, as for example, in producing a forging die.

Referring to FIGS. 27, 28, 29, 30 and 31, there are shown perspective and sectional views of an electrode with minor variations for sinking cavities having irregularly shaped bottom and/or side wall surfaces.

Into a metallic header 323 are drilled a multiplicity of holes arranged in a regular pattern, as shown in the fragmentary header layout drawing of FIGS. 29 or 30.

Then metal tubes 325 are fitted into the header holes, and their inner ends are expanded slightly by a tapered tool or brazed or otherwise secured to seat, seal, and lock the tubes in the header. The tubes may be straight or, optionally, they may be enlarged at their working ends as shown at 327. The enlargement may be accomplished by electroplating—for example, with copper or nickel—to a depth of, say .005" to .010" or more. The purpose is to permit close spacing of tubes 325 at their working ends without making it too difficult to fabricate header 323 by requiring exceedingly thin walls between the holes for the tubes. The tube bundle may be made by copper plating stainless steel tubes; then nesting them together and soldering them into a header 323 at one end, and thereafter dipping the working end in nitric acid to eat away the copper and leave the stainless steel so that there is space between the tubes at the working end for exit of electrolyte.

For rough work the tubes may be about 1/16" in diameter and should have center bores about .030" for the passage of electrolyte. The spacing between tubes should not exceed 1/64", and this close spacing may be brought about either by close spacing of the header holes or by enlarging the working ends of the tubes and using somewhat more generous spacing of the header holes. To minimize pattern in the work we prefer needles of about .025" outside diameter with .010" bore and about .010" spacing.

A chamber 331 is formed in the header 323 for introducing electrolyte into the tubes, and a cover plate 333 is fastened by bolts 334 to the header. In the cover plate is a centrally located opening threaded to receive a pipe fitting 335 at the end of a rigid supply tube 337, which also serves for mounting the electrode in a feed device; for example, like that of FIG. 1. An electric cable (not shown) brings the negative electrical connection to the header and is conveniently fastened under one of the bolts 334 holding the cover plate 333 to the header 323.

In FIGS. 27, 28, and 31 there is shown a compound contour at the working end of the tubes 325. This may be shaped by a variety of mechanical means, if so desired. For example, the individual tubes 325 may be precut to the appropriate lengths before being inserted and fastened in header 323.

I prefer, however, to use a process which I believe to be unique to impart the desired shape into the electrode. A master form is made with a shape which is a negative of the shape desired in the electrode. This may be made of metal, or it may be of plastic or plaster with a conductive metal coating. The master form is mounted in the place where the work is ordinarily mounted, and the polarity of the power source is reversed so that the electrode is an anode.

At this point it should be understood that the tubes 325 may terminate roughly on a plane normal to the tube axes. Their ends do not define any special form.

Now, with electrolyte being pumped through the supply tube 337 and through the tubes 325 the electrode assembly is advanced slowly toward the master form. As any tubes approach the master form they are anodically reduced, shortening their length to conform to the shape of the master form. When all of the tubes are far enough advanced to be in active electrolytic relationship with the master form—that is, when all have been shortened somewhat by electrolytic attack—the speed of advance of the electrode is increased as much as possible without causing contact with the master form. Then, simultaneously, the electrolytic current is turned off, and the advance is stopped. By the fast feed for final forming, each tube is brought within .001" of the confronting surface of the master form so that any deviation between the form of the master and the form defined by the tube ends is less than .001".

The master is then replaced by a workpiece—for example, a hardened die block—the polarity of the electrical supply is restored to normal so that the work is the anode, and now the form established by the master can be reproduced in the work.

To do this, the same procedure is followed as in shaping the electrode. The advance of the electrode is held at moderate speed until all tubes are electrolytically removing work material. Then the speed is increased to the maximum attainable without contact with the work. This maximum is determined by the nature of the work material, the electrolyte, its temperature, its pressure, the voltage, the available current supply, etc. As a practical matter, one learns quite quickly what speeds are suitable under practical operating conditions. For this work where high accuracy is desired, it is good to use electrolyte of lower conductivity made, for example, by diluting a high removal solution with water. By reducing the conductivity, the differential in removal rate between the parts of the electrode in close proximity to the work and those more remote is accentuated so that better conformation between electrode and work is obtained.

It has been found practical to make the tubes 325 of 18–8 stainless steel because this material can be reduced very rapidly for shaping the electrode. Also, the removal is even and the surface is smooth.

When the cavity has been formed by this means, the cavity surface will show the pattern of the tubes 325, but only a relatively small amount of material needs to be removed to smooth the surface to acceptable standards, if the tubes are small and the tube spacing is close.

It should be observed that the spaces between the tubes provide channels for the exhaust of electrolyte.

If desired, the outside tubes, after the electrode has been shaped, may be coated with ceramic so that the side walls of the cavity will not be unduly attacked and removed electrolytically. For many cavities of this general kind, this is not important, but for some it is.

It should also be noted that for fine detail, or where there are steep contours, finer tubes may be and should be used, and I have successfully used tubes of .020" in diameter with .010" spacing, and probably even smaller tubes could be used, if necessary, by providing adequate electrolyte pumping pressure and good filtration to prevent clogging of tubes of fine bore.

FIG. 27a shows an electrode similar to that of FIG. 27 as used for forming grooves 328 in the surface of a rotating workpiece. Here the work, a ring W, is held by chuck jaws 330 and rotated upon a spindle 332. The electrode is supported by the electrolyte supply pipe 337 in a tool rest and advanced into the work as the work rotates. Electrolyte at a pressure of 25 to 200 pounds per square inch is pumped through the electrode. It thus cuts a smooth slot in the workpiece periphery.

In general, the electrode illustrated in FIGS. 27 to 31 is suitable for the rapid removal of work material, particularly where the side walls and bottom surface of the cavity produced in the work may be somewhat rough without this being objectionable. Because of the rotation of the work in FIG. 27a, the groove formed will, of course, be smooth. When it is desired to produce cavities having a better finish, I prefer to use electrodes constructed generally after the fashion illustrated in FIGS. 32 to 38. The electrode of FIGS. 32 and 33 is essentially similar to the one shown in FIG. 26 in that a piece of porous metal 321 is secured at the working end of a tubular electrode member 275. It is preferable, however, for use in forming cavities of larger size than the electrode illustrated in FIG. 26, since it provides for an escape of the electrolyte from the interface between the electrolyte tip and the work in much the same way that the electrode escapes from the work through the spaces between the tubes 325 in the electrode of FIGS. 27 and 28 for instance.

The porous metal member 321 is provided with one or more transverse holes 339 which are connected to the working face of the electrode by a plurality of smaller holes 341. The electrolyte, therefore, under pressure within the tube 275, finds its way to the working face of the electrode through the tortuous passages within the porous member 321, and this electrolyte then escapes by way of the small passages 341 to the larger channels 339 which carry the electrolyte away from the work. If it is found that an excessive amount of electrolyte escapes directly into the channel 339 for instance, without reaching the work, these channels can be sealed as by burnishing for instance, and this treatment may also be given to the smaller passages 341 so that although there may be some leakage directly into these passages, such leakage is a minor consequence. Alternatively these surfaces may be lightly tinned with solder or plated to effect the seal.

The electrode of FIGS. 34 and 35 is made from a single block of metal 343, the end portion of which is shaped to the contour of the hole to be formed. A plurality of holes 345 is drilled through the block, these holes extending longitudinally of the electrode and having their top ends interconnected within a hollow space 347 provided in the upper portion of the block. The diameter of the holes at the exit end should be relatively small, and I have found that a hole size of .030" seems best, since it neither produces nibs, as do larger holes, nor craters, as do smaller holes. If desired, in order to reduce the pressure drop through the electrode, these openings may be enlarged from the recess 347 down to a position slightly above the working face as is indicated at 349. The lower portion of the block is then slotted as at 351. Although these slots may run in any convenient direction, the practical consideration is that they are to provide channels for the escape of the electrolyte from the working face, and they are therefore shown in the FIGURES as being positioned between each of the holes 345 and intersecting at right angles. It is important that the distance from any hole to the adjacent exit slot be short, not more than three quarters of an inch. Thus the electrode is made up of a plurality of small rectangular electrodes, each of which has a small opening at the center for supplying electrolyte to the work, with the slots between the individual electrode members providing for the escape of electrolyte after it has traveled only a short distance within the work gap.

The electrode of FIGS. 36, 37, and 38 is generally similar in the overall result produced to the one shown in FIGS. 34 and 35. Here, however, the electrode block 343 has its lower end shaped to the contour of the cavity to be produced and the block is provided with a cavity 347 in its upper portion to receive the electrolyte. This cavity is connected to the working face by a plurality of drilled holes 345 which conduct the electrolyte. Interspersed between these holes are other holes 353 which extend partway up into the block, where their upper ends are connected to transversely extending manifolding passages 355. Preferably, to reduce and tend to equalize the pressure drop for all of the holes 353, the transverse passages 355 are drilled in both directions at right angles to each other, as is illustrated in FIG. 36.

Electrolyte is therefore supplied directly to the working face through the channels 345 and flows over the working face only a very short distance before passing upwardly through an adjacent hole 353 to one of the transverse passages 355, and through this passage to the outside.

All of the electrodes discussed above may be relieved to a shallow depth at their side faces, and this recessed portion may be coated with a ceramic layer which, as previously described in connection with the description of other electrodes, is for the purpose of inhibiting side action as between the electrode and the side walls of the cavity. Furthermore, as previously described, the end face of this and other electrodes may be shaped by deplating; that is, by reversing the current and plating away the end face of the electrode as it approaches a shaped tool which has a contour which is the negative of the contour desired upon the electrode.

FIGS. 39 and 40 show electrodes generally similar to those illustrated in FIGS. 34 and 35, excepting that the individual electrode end faces indicated at 357 are hexagonal rather than rectangular. Each of these end faces is connected to the interior 347 of the electrode by passages 349 which lead to small holes 345 at the working end of the electrode. If desired, and as shown in FIGS. 39 and 40, the hexagonal end faces 357 may be spaced from each other sufficiently so that as the electrode is advanced into the work, a honeycomb formation of ridges remain as an integral portion of the main body of the work. This arrangement is of great utility where it is desired to remove weight, as in aircraft elements and equipment, without appreciably reducing the overall strength of the particular part. If the working tips are brought close enough together (about .010" to .015"), the honeycomb fin will be eliminated and this arrangement is useful when removing material over a large area, since the round stems above the hexagonal faces provide considerable flow capacity for conducting electrolyte away, particularly from the central portion of the electrode. Ordinarily, with large electrodes it is difficult to provide enough exit area at the center to insure even electrolyte flow throughout the electrode.

The electrode illustrated in FIGS. 41, 42, and 43 has an arrangements generally similar to that of FIGS. 36, 37, and 38 excepting that the working face 359 is at the side of the electrode rather than at the end thereof. This is particularly advantageous where it is necessary to insert the electrode into a space having relatively low clearance above the surface to be worked upon. Thus the electrode of FIG. 41, for instance, can be inserted into a drilled opening or into a rough formed space between turbine blades at the edge of a disc, and then moved laterally so as to shape the contour of the face operated against. In this arrangement, a hollow space 361 at one end of the electrode is connected by a plurality of longitudinally extending passages 363 with transversely extending small passages 365 which lead to the working face. Interspersed between the passages 365 is another set of passages 367 which extend straight through the electrode to the back surface thereof so as to provide a means of escape for electrolyte. If the electrode is to operate within a confined space where the back surface of the electrode may be close to a portion of the cavity where it is desired not to remove metal, it may be advantageous to coat this back surface with ceramic material as previously discussed so as to render this surface electrolytically inert. Such a coating is indicated at 369.

FIGS. 44 and 45 illustrate an electrode generally similar to the one forming the subject matter of FIGS. 41, 42, and 43, excepting that the electrode is quite thin and is supported at both ends by mounting tabs 371. These tabs may be clamped in a suitable fixture so as to bring the working face 373 against the surface to be finished. This type of electrode is particularly suitable where the clearances are small, as between turbine blades, for instance, which have been rough finished by an electrode of the type illustrated in FIGS. 3, 5, and 6.

As with the previous electrodes of this general character, a multiplicity of holes 375 communicate between the working face and channels 377 which extend relatively parallel to the working face and channels 377 which extend relatively parallel to the working face. These channels are connected at one or both ends to a manifold 378, the manifold in turn being connected to a source of electrolyte under pressure. Between the holes 375 other holes 379 extend through the electrode from the working face to the back surface thereof so as to provide a means for escape of the electrolyte. As with the other electrodes, the working face of the electrode of FIGS. 44 and 45 may be shaped to the precise working contour by reversing the direction of current supply thereto, and bringing this working face against a master tool so as to deplate the working face of the electrode to the precise desired contour.

One of the advantages of shaping the working face or end of the electrode by electrolytic action is illustrated in FIGS. 46, 47, 48, and 49. In FIG. 46 the tool is indicated generally at 381. This tool may be considered as having a conical nose 383 which is to be used in shaping a cavity. This nose, however, will not shape a precisely conical hole, since the electrolytic action is greatest at the sharp point indicated at 385. Thus the cavity produced in the work will appear much as that shown in the block 387 immediately therebelow. In this representation it will be noted that the sides of the cavity throughout the major portion of the surface have a conical contour which conforms to the face 383, this conical surface being indicated at 389, but that the extreme bottom center of the cavity will be deepened as indicated at 391. Although it would, of course, be possible to calculate and mechanically modify the end of the electrode 381 so as to avoid this, it is far easier to provide a shaping tool 393 having a conical cavity 395 therein.

If the current is now connected in a reverse direction and the electrode 381 is advanced into this cavity, it will be found that the end of the electrode will be shaped to conical contour, excepting that the extreme end at 397 will be rounded because of the greater electrolytic action at this position. After being so shaped, the conical electrode at 381 with the slightly rounded extreme end can then be used to shape cavities which will be a much closer approximation to the desired truly conical surface.

The same general situation is illustrated in FIGS. 48 and 49 which relate to the shaping of the edge contour of an electrode. As an example, if it is desired to form an electrode of the type shown in FIGS. 39 and 40, and if the hexagonal end surfaces 357 have sharp corners, a cavity much like that indicated at 399 will be produced in which each of the corners of the cavity will have a slight outwardly extending radius as at 401, somewhat exaggerated in this view for the purpose of illustration. On the other hand, if the roughly formed electrode is advanced into cavities of the type illustrated in FIG. 49 at 403, such that these cavities have the desired sharp corners 405 with the current reversed so as to deplate the electrode, the result will be to remove slightly more metal from the corners of the electrode so that these corners are slightly rounded, much as they appear at 407. This electrode can then be used in sinking a cavity in the workpiece, with the result that the cavity will be truly hexagonal with sharp corners. In fact if the electrode is of a material having electrochemical characteristics like that of the work, then if the electrode is shaped under working conditions as to voltage, speed, electrolyte temperature and pressure, etc., then the deviations in the electrode from the master will approximate extremely closely the needed compensations to produce the desired shape in the work. Thus it will be appreciated that although under some conditions where relatively sharp corners and points are involved, the electrode shapes a cavity differing somewhat from the contour of the electrode, this problem may be easily overcome by shaping the tip of the electrode by a deplating operation in conjunction with a surface which has the contour it is desired to reproduce in the work.

In FIGS. 50, 51, and 52 I have shown an adaptation of this process for the purpose of providing slots, much of the type usually accomplished by milling. In FIGURE 50, the work W is supported so as to move horizontally along machine ways 409. A pair of uprights 411 are rigidly secured to the frame of the machine, and these uprights are vertically slotted as at 413. The electrode, indicated at 415, is provided at one end with an angle bracket 419 connected to one of the uprights 411 by means of a clamping screw 421 which extends through the angle bracket and through the appropriate slot 413. Thus, by loosening this screw, the right hand end of the electrode (as seen in FIG. 50) may be moved upwardly or downwardly as desired, and the electrode may be tilted with the screw serving as a pivot. At the opposite end the electrode 415 has a similar angle bracket 423 connected by a screw 425 to a link 427 connected at its opposite end by a screw 429 to the left hand upright 411, the clamping screw 429 passing through the slot 413 therein.

As seen in FIGS. 51 and 52, the electrode consists of a block having a passage 431 extending longitudinally therethrough. One end of this passage is connected by an appropriate fitting 433 to an electrolyte supply hose. A portion of the block 415 extends downwardly, and is milled off at each side so as to provide a thin extension 435 which is slightly wider at the lower end as indicated at 437. The side walls of the extension 435 may be coated, as previously described, with a ceramic layer 439. A plurality of holes 441 are drilled upwardly through the extension 439 from the working face 443 into the passage 431. Electrolyte is therefore supplied by way of the hose fitting 433 to the passage 431, and thence downwardly to the working face through the drilled holes 441. From the working face it is removed by an air blast from appropriately placed nozzles 445, a plurality of which will ordinarily be used. This minimizes unwanted electrolytic erosion except very close to the electrode, and is important for holding sharp and accurate edges, etc.

As shown in FIG. 50, the apparatus is set up with the electrode tilted somewhat so that the left hand end of the electrode slightly clears the work W as the work is advanced toward the electrode, whereas the right hand end of the electrode is positioned somewhat closer to the table, its lower end being set a few thousandths of an inch above the bottom of the slot it is intended to cut in the work. With the electrolyte flowing and the electric power turned on, the work is slowly advanced toward the electrode, and as it reaches a position a few thousandths of an inch spaced therefrom, the electrolytic action will begin to deplate the work, and this will continue as the work advances so that when it passes the opposite end of the electrode the slot will be cut to its full depth.

The holes 441 should be small enough and the rate of supply of electrolyte great enough to insure against a failure of electrolyte pressure at any of the holes when most of the working surface of the electrode is exposed in a position remote from the work. Alternatively, flow through the individual holes may be individually controlled.

Figure 53:
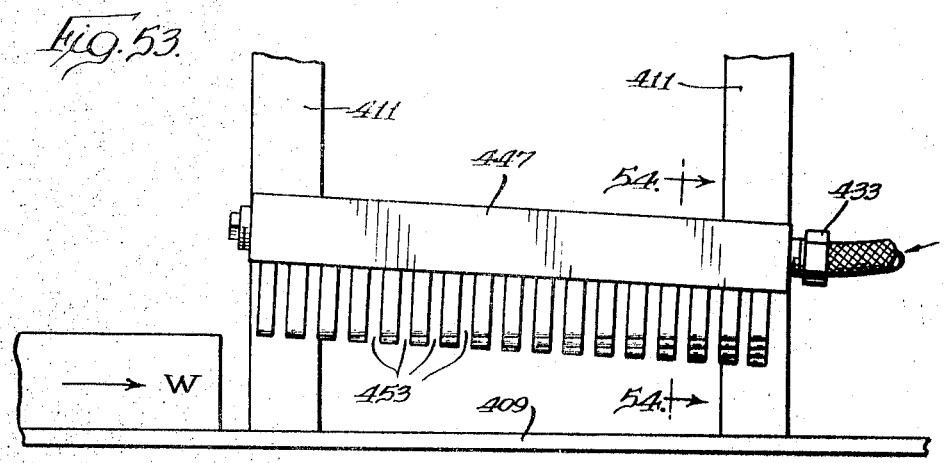
FIG. 53 is a view similar to FIG. 50, but showing an adaptation of the apparatus for contouring surface areas, particularly under conditions where the contour produced is irregular in one direction.
Figure 53A:
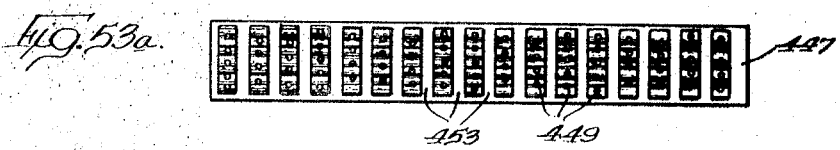
FIG. 53a is a view of the working face of the electrode of FIG. 53.
Figure 54:
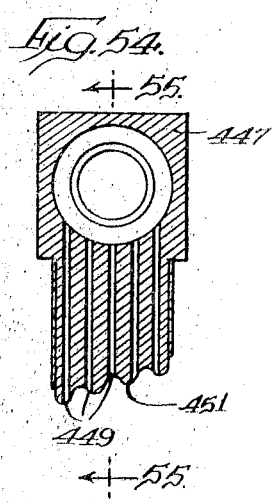
FIG. 54 is a tranverse sectional view which may be considered as taken in the direction of the arrows substantially along the line 54—54 of FIG. 53.
Figure 55:
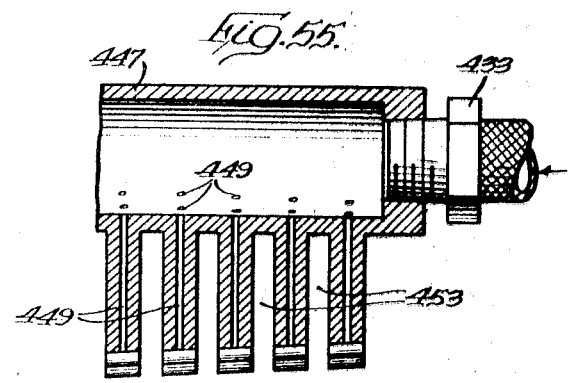
FIG. 55 is a fractional longitudinal sectional view through the electrode of FIGS. 53 and 54, and may be considered as taken in the direction of the arrows along the line 55—55 of FIG. 54.

The same general scheme is illustrated in FIGS. 53, 53a, 54, and 55 excepting that the electrode 447, instead of being contoured to cut a slot in the work W, is rather of a considerable width, as is best indicated in FIGS. 53a and 54, and has its lower edge irregularly contoured so that, as shown, it produces serrations in the face of the work. The arrangement and the electrode may be considered as essentially similar to the one shown in FIGS. 50 and 52, excepting that the electrode is wider and, instead of having a single row of holes 441 leading through the electrode from the working surface to the longitudinally extending passage 431, it has several rows of such holes as is indicated at 449. These rows of holes should be staggered much as shown, so as to prevent striation of the work. Additionally, instead of being flat, the lower or working face is irregularly contoured transversely, and as will be seen in FIG. 53a, the serrations should be tapered so that as the electrode advances downwardly into the work it also, in effect, moves transversely into the work. If this is not done, the grooves formed in the work will be wider than they should be because of the electrolytic side action when the proper depth is achieved. An appropriate taper may be formed by milling the slots in the tool face at a slight angle toward one side and then remilling the slots at a slight angle toward the other side.

This produces a slot in the electrode which is true at the end where the work is to leave the electrode, but which is wider at the entering end. As the electrode advances into the work, the ridge portions therefor move downwardly and sidewardly simultaneously.

In any event, regardless of the manner of forming the serrations 451, the tool is placed in a slightly inclined position as is best illustrated in FIG. 53, and the work traversed beneath the tool slowly so that as it emerges at the right hand end it bears the serrated surface provided in the working face of the electrode. It will be appreciated that this arrangement is not limited to simple serrations, but that variations may be made in the contour of the working face of the electrode and that the electrode will produce a negative of the contour of the electrode in the workpiece as the work is traversed beneath the electrode. In the tool shown in FIGS. 53 to 55, because of its width it is desirable to provide transverse saw slots 453 between each set of electrolyte supply passages 449.

FIG. 56 shows a simple arrangement for adapting the present process for such applications as deburring the ends of coil compression springs and similar articles. It will be understood that after coil compression springs—such as internal combustion engine valve springs, for instance—are manufactured and the ends ground flat, there is always a burr or feather edge which comes about as a result of the grinding operation. This burr or feather edge is comparatively expensive to remove, particularly from the inside edge. The arrangement and fixture illustrated in FIG. 6, however, accomplishes this in an expeditious fashion as follows. The bed 455 of the fixture has a plurality of threaded sockets 457 therein, each of these sockets being connected by a passage 459 to a hose 461 which supplies electrolyte. The base 455 is also connected by a terminal 463 to the positive side of an electrolyzing current supply. A work holder 465 is threaded into each of the sockets 457, and has a recess 467 therein to contain a spring 469 to be deburred. This spring is retained in position in the present example by a cone-pointed set screw 471. This set screw secures the spring 469 in position with its lower end against the bottom of the recess 467, while its upper end is slightly below the top of the recess 467. A generally conical electrode 473 is positioned with its pointed end within the upper end of the spring 469, but so that it does not quite touch the spring. This electrode is threaded into a support member 475 and is connected to the negative side of the power supply as exemplified by the terminal 477. The electrode 473 must, of course, be insulated from the side of the power line represented by the work holder 465, and, as shown, this is accomplished by forming the member 475 of insulating material, and, for convenience, this member is hinged as at 479 to the base portion 455.

Thus the group of electrodes 473, and their support member 475, may be tilted backward about the hinge 479 so as to enable springs to be removed from the sockets 467 and replaced by a new set of springs to be finished. Thereafter the electrodes 473 are tilted to the position shown in close adjacency to the upper ends of the springs 469, after which the electrolyte flow is established and the electrolyzing current turned on. The action is to deplate the upper ends of the springs 469, and of couse if this action is carried forward only for a short period of time, this deplating action will have the effect of removing the burr at the ends of the springs so as to give a smooth finished contour to the article without removing appreciable material from the main portion of the springs.

From the above description of my invention which has been illustrated in several embodiments and variations, the features and applications of the inventive idea to practical problems have been discussed. From this it will be apparent that certain generalizations may be made.

The amount of metal removed from a workpiece by electrolytic action is a direct function of the current in the electrolytizing circuit. The voltage necessary to pass any particular current with any particular set of circumstances will depend upon the spacing between the electrode and the workpiece. It will also depend upon the electrode size or effective area, but for a particular job the electrode size usually will not be a variable.

The cost of operation will vary rather directly with the wattage that is, the amperage in the circuit times the voltage necessary to produce the current. From these considerations it follows that from the practical standpoint it is essential that the electrode to workpiece spacing be held to a practical minum so that minimum voltages may be used, thereby enabling the operation to be conducted at minimum cost. As an example, by following the teachings of the present invention, precisely held small spacings may be used and most electrolyzing operations may be conducted at approximately ten volts, or, in some cases, even less with work gaps from half a thousandth to a few thousandths of an inch. The current densities which appear to be most satisfactory as a practical matter are between 100 and 3000 amperes per square inch of effective electrode area. The wattage, therefore, is between one and thirty k.w. per square inch. For large areas the voltage may be reduced to four volts, while still obtaining reasonable current density.

All prior systems with which I am familiar, which attempt to remove metal by electrolytic action, require far greater total electric energy than this to remove an equivalent amount of metal. Prior workers in this field have found it necessary to use voltages of the order of 100 to 110 volts or more, with the result that the energy requirements—or in other words, the cost of removing the metal—is of the order of ten or more times that required when using the invention discussed above. Furthermore, if low voltages are attempted with wide work gaps, the rate of material removal is low and thus more machines are required to produce the same amount of work. It is apparent, therefore, that regardless of the approach to the problem, the accomplishment of high current densities with low voltages is economically essential.

Also, as previously indicated, high voltages, together with comparatively large work gap spacings produce an electrolytic action that is far less controllable, and therefore the work produced cannot be as precise as the work produced by using the present invention.

In general, it may be said that simple narrow-edged, open-ended electrodes of the general character illustrated in FIGS. 3, 4, 8, 9, 18, 18a, 19, 20, 21, 22, 23, and 24 will cut the most rapidly. They also leave comparatively regular and smooth side walls but the center of the work acted upon is not cut away as rapidly as the work directly beneath the electrode edge, since it is much farther from the electrode active surface. This is well illustratd in FIGS. 8, 20, 21, and 22. This electrode, therefore, may be considered as the approved type when it is desired to sink a hole all the way through a workpiece, as in FIGS. 20, 21, or 22, where the small center piece will fall away, or, under some conditions, where there is to be a subsequent finishing operation, or where the protuberance at the center is of no disadvantage. Under some special circumstances this protuberance may even be an advantage, as in FIG. 9, where it is desired subsequently to upset the end of a member in the hole so as to provide a stud firmly anchored to the work, for instance. In general, everything else being equal, rapid sinking of the electrode into the work will give a higher and sharper protuberance than will slow movement of the electrode. This difference may be appreciated by a comparison of FIG. 8 with FIG. 9. In FIG. 8 the electrode is moving rapidly in order to produce a tapered hole having a small diameter at the bottom, whereas in FIG. 9 the electrode is moving slowly so as to produce a reverse taper.

Where it is desired to sink a cavity having a considerable area at the bottom, and where it is desired that the bottom be of generally controlled contour, but under conditions where both the bottom and side walls may be allowed to be somewhat rough, a multiple tube electrode of the type illustrated in FIGS. 27, 28, 29, 30, and 31 is highly satisfactory. A smooth finish with this type electrode may be achieved, however, by using small diameter closely spaced tubes or by producing relative movement between the work and the electrode—in addition to simple advance of the electrode—in such manner as to continually expose the end of the electrode to a shifting work surface for this purpose a vibrator mounted so as to shake the electrode may be used. Another example of this approach is illustrated in FIG. 27a. The embodiments of FIGS. 50 to 55 also illustrate this general principle of operation, which results in a smooth bottom contour of the surface being worked upon.

If a comparatively high order of precision is required both as to the character of the surface produced upon the work and as to dimensional tolerances, I prefer to use an electrode of the general type of FIGS. 34 to 38. These electrodes, it will be noted, have a comparatively sharp outline, and the end of the electrode which produces the bottom surface has considerable smooth electrode surface in which the individual openings for the supply and removal of the electrolyte are kept relatively small. For best results, the supply holes should have a diameter of about .030" and the distance between the supply and exhaust openings should be kept short. If a high spectral finish is desired, the pressurizing system of FIG. 24 is of value.

Air jets may be used, as previously discussed, to prevent unwanted electrolytic action between side surfaces of the electrode and the work, where the electrode is not in close proximity to the work but where electrolyte is caught in stagnant pockets. The air is used to blast away the stagnant electrolyte. The arrangement of FIG. 1 in which the work is positioned above the electrode is also helpful in eliminating stagnant electrolyte pockets as gravity causes the electrolyte to fall away from the work area. This is the case in forming cavities in the work. Where the part to be produced is a punch or the like so that there is a cavity in the electrode, then the electrode is placed above the work so that gravity helps to clear away the electrolyte except where there is close spacing between the electrode and the work.

A wide variety of electrolytes may be used in the apparatus and processes heretofore described. Some work materials respond to acid solutions of 5% to 25% of the appropriate strong acids such as hydrochloric, nitric and sulphuric. Other materials, such as cemented carbides—e.g., tungsten, tungsten carbide, titanium carbide, etc.; respond better to caustic solutions such as a 20% solution of potassium hydroxide, to which may be added 5% sodium tungstate.

To the extent possible without excessive loss of removal rates, it is preferable to use neutral or nearly neutral salt solutions because they are much easier and safer for routing shop handling. A solution of this type which has shown good versatility and good removal rates may be made by adding to 15 gallons of water the following:

| | Pounds |
|---|---|
| Potassium chloride | 30 |
| Potassium nitrate | 10 |
| Potassium citrate | 10 |
| Rochelle salts | 10 |

This solution, when supplied to the electrode at a temperature between 120° F. and 150° F., will give good removal rates on a wide variety of steels, including stainless steel, and also, a great many of the so-called super-alloys of nickel, cobalt or iron base and containing as alloying materials, in addition to those three, such materials as chromium, molybdenum, tungsten, titanium, columbium, etc.

In addition to removing material at good rates, a good finish is obtained, and, particularly on the high alloy stainless steels and the super-alloys, a bright, reflective surface may be created where the surface is exposed to electrolysis under conditions of pressure and high velocity in the electrolyte, as previously explained.

I have found that an essential to good performance of an electrolyte is that the metal salt products of electrolytic decomposition be readily soluble. For example, aluminum is not easily worked by this process with many electrolytes which are usable on other materials, as the anodic action forms aluminum salts which are not very soluble or not soluble at all and form an anodic film on the work. But a simple 5% or 10% solution of acetic acid yields good results because the relatively complex aluminum salts formed are soluble enough to be readily washed out of the work gap.

Where fine detail of pattern is to be reproduced, it is desirable to use a solution which is considerably more dilute than is desirable for maximum removal rates. Thus, the quantities of salts used in the table above are reduced to one fourth to one sixth the values shown for the same amount of water. The voltage applied is also reduced. The purpose is to accentuate the difference is removal rate between those areas where the electrode is close to the work and those where it is more remote. If the electrolyte is too conductive and the applied voltage is too high, then the difference in resistance path between areas of close proximity and others of greater spacing is not very great, and the detail of pattern becomes blurred.

Referring to the solution in the table, this has been used successfully in a four-to-one dilution to duplicate coin patterns in the following configuration and procedure. First, a coin is positioned opposite an electrode like that of FIG. 26, using a disc electrode of porous sintered bronze in the form of a disc about one inch in diameter and ⅛" thick. The electrolyte is pumped at about 100 p.s.i. through the electrode disc after passing through a filter designed to remove all particles down to five microns. The electrolyzing current is first connected in a sense to make the electrode positive. The electrode is then advanced until it very nearly touches the coin. Then current is turned on at four volts for one or two seconds, the electrode is then advanced, and this is repeated until ample depth has been reached to embrace all of the coin face pattern. Then, the coin is removed and replaced with a piece of die steel, and the power leads are reversed so that the electrode is now a cathode. The electrode is now advanced toward the steel, using a voltage of six volts, and again, very close proximity is used—a few ten thousandths of an inch of spacing—and the electrode is advanced into the steel to a depth great enough to embrace the pattern. By this means, it has been possible to reproduce fairly fine detail, and, in comparing the height of the coin pattern above its flat areas with the finished steel replica, it has been possible to bring these measurements within less than .001" of difference between the original coin and the steel pattern. So far as I am aware, such close copying by electrolytic removal means has never been approached before.

In the foregoing description, various parameters have been described with respect to the apparatus components and the steps which are embodied in the method of carrying out the present invention. In the following claims it is intended that the language used in describing the apparatus components and the method steps be related within the range of permissible and reasonable equivalency to the description and disclosure. For example, it has been found that reasonably good results can be obtained by furnishing the electrolyzing direct current within the range of approximately four to 15 volts. Within this approximate range, and depending upon the resistance in the work gap, the current density will usually be in the range of 100 to 3,000 or more amperes per square inch. The resistance in the work gap is determined by the width of the gap and the character of the electrolyte therein. Work gaps of less than .001 inch, e.g., .0005 inch, and as great as .012 inch have been described. When the electrolyte is pumped through such gaps at temperatures in the range of 120° F. to 160° F., a pressure of several atmospheres must be used to inhibit bubbling or boiling of the electrolyte and the consequent reduction of its conductivity. Therefore, the electrolyte is pumped through the gap at pressures within the range of 50 p.s.i. to at least 200 p.s.i. to obtain high back pressure in the work gap with a resultant high electrolyte velocity through the work gap, thereby substantially to raise the boiling point level of the electrolyte so as to inhibit the formation of gas bubbles in the electrolyte and to flush away the eroded workpiece material.

From the above discussion it will be apparent that although this invention may be used for producing shapes and cavities of an irregular character, such that they would be extremely difficult to form by any other process, the invention also has a high order of utility for replacing more conventional machining operations when the workpiece is one of the super-alloys or other material which is for all practical purposes, largely non-machinable. The embodiment illustrated in FIG. 27a, for instance, would not be likely to replace an ordinary turning operation on mild steel or other easily machinable materials, but its superiority is evident upon hardened tool steel or super-alloys, or other non-machinable materials.

From the above description of my invention as embodied in several alternative variations, it will be appreciated that many changes may be made both in the apparatus and in the method without departing from the scope or spirit of the invention, and that the scope of the invention is to be determined from the scope of the accompanying claims.

Having described my invention, what I claim as new and useful and desire to secure by Letters Patent of the United States is:

1. In the electrolytic process of removing material from an electrically conductive and electrochemically erodible workpiece by means of an electrode structure having a conductive working face, said workpiece and said electrode structure being relatively movable, the method which comprises pumping a liquid electrolyte to a work gap not substantially more than about .012" wide between the electrode working face and the workpiece at a pressure of not less than about 50 pounds per square inch at the entry of the electrolyte to the electrode structure and the work gap so as to push the electrode working face and workpiece apart with a variable hydraulic force which increases as the electrode working face to workpiece spacing in the work gap decreases, applying a substantially constant force between the electrode structure and the workpiece in a direction to urge the electrode working face and workpiece together, the last said force being lower than the force which would be required to cause contact between the electrode working face and the workpiece, whereby the electrode working face to workpiece spacing in the work gap will be maintained substantially constant in dynamically stable equilibrium without mechanical contact between the electrode structure and the workpiece, and impressing an electric potential between the electrode working face and the workpiece.

2. In the electrolytic process of removing material from an electrically conductive and electrochemically erodible workpiece by means of an electrode structure having at least one electrolyte passage therethrough and an electrically conductive working face, said workpiece and said electrode structure being relatively movable, the method which comprises pumping an electrolyte through the passage to a narrow work gap not substantially greater than about .012" wide between the workpiece and the working face of the electrode structure so that the electrolyte exits from the passage at the working face, the electrolyte being supplied at a pressure of not less than about 50 pounds per square inch at the entry of the electrolyte to the electrode passage and the work gap so as to push the electrode working face and the workpiece apart with a variable hydraulic force which increases as the electrode working face to workpiece work gap spacing decreases, applying a substantially constant force between the electrode structure and the workpiece in a direction to urge the electrode working face and the workpiece together, the last said force being less than the force which would be required to cause contact between the electrode working face and the workpiece, whereby the electrode working face to workpiece work gap spacing will be maintained substantially constant in dynamically stable equilibrium without mechanical contact between the electrode structure and the workpiece, and impressing an electric potential at high current density of not less than about 100 ampers per square inch between the electrode working face and the workpiece in a sense to make the electrode a cathode and at a voltage which is insufficient to produce sparking in the work gap.

3. In the electrolytic process of removing material from an electrically conductive and electrochemically erodible workpiece by means of an electrode structure having an electrically conductive working face, the workpiece and the electrode structure being relatively movable, the method which comprises pumping an electrolyte to a work gap between the electrode working face and the workpiece at a pressure of not less than about 50 pounds per square inch at the entry of the electrolyte to the electrode structure and the work gap so as to push the electrode working face and the workpiece apart with a variable hydraulic force which increases as the electrode working face to workpiece spacing decreases, applying a substantially constant force between the electrode structure and the workpiece in a direction to urge the electrode working face and the workpiece together, the last said force being such that the electrode working face to workpiece spacing will be maintained substantially constant at a distance from about .0005" to about .012", momentarily confining the flowing electrolyte at superatmospheric pressure between the electrode working face and the workpiece by the close spacing distance between the electrode working face and workpiece and without mechanical contact between the electrode structure and the workpiece, and impressing an electric potential at a current density of from about 100 to about 3000 amperes per square inch between the electrode working face and the workpiece in a sense to make the electrode a cathode and at a potential of the order of not appreciably more than about fifteen volts.

4. In the electrolytic process of removing material from an electrically conductive and electrochemically erodible workpiece by means of an electrode having at least one electrolyte passage therethrough and an electrically conductive working face, the electrode being movable relative to the workpiece to define therewith a narrow work gap of not substantially more than about .012", the method which comprises pumping an electrolyte through the electrode under pressure so that the electrolyte exits from the electrode at the working face into and through the work gap, the electrolyte being pumped in a closed passage to and through the electrode and into the work gap at a pressure of not substantially less than about 90 pounds per square inch at the entry of the electrolyte to the electrode passage and the work gap, impressing an electric current of a potential within the range of approximately four to fifteen volts and at a current density within the range of approximately 100 to 3000 amperes per square inch of electrode working face area between the electrode working face and the workpiece in a sense to make the electrode working face a cathode so as to remove material from the workpiece, and advancing the electrode relative to the workpiece without mechanical contact between the electrode and the workpiece as material is removed from the workpiece so as to maintain the work gap spacing and electrolyte under superatmospheric pressure within the work gap.

5. The method called for in claim 4, in which the temperature of the electrolyte pumped to the electrode is about 120° F.

6. In the method of electrolytically shaping an electrically conductive and electrochemically erodible workpiece by passing an electrolyzing current between the workpiece and an electrode having an electrically conductive working face closely spaced thereto in the presence of an electrolyte, the workpiece and the electrode working face being relatively movable toward each other, the improvement which comprises moving the workpiece and the electrode working face toward each other at a movement rate such as to maintain a substantially constant interspace work gap of not more than about .012" between the workpiece and the electrode working face as an equilibrium between the rate of material removal and the interspace distance without making mechanical contact between the workpiece and the electrode working face, simultaneously pumping a liquid electrolyte through a closed passage to the interspace work gap at a regulated volume and pressure so as to maintain a static pressure of not less than about 50 pounds per square inch on the electrolyte at the point of entry of the electrolyte into the interspace work gap, and impressing a high density direct current having a closely regulated substantially constant low voltage of not appreciably greater than about fifteen volts between the electrode working face and the workpiece in a sense to make the workpiece anodic, whereby eroded workpiece material is flushed away and the formation of gas bubbles in the electrolyte is inhibited.

7. In the method of electrolytically shaping an electrically conductive and electrochemically erodible workpiece by passing an electrolyzing current between the workpiece and a hollow electrode having an electrically conductive working face closely spaced thereto in the presence of an electrolyte, the workpiece and the electrode working face being relatively movable toward each other, the improvement which comprises positively moving the workpiece and the electrode working face toward each other at a movement rate such as to maintain a substantially constant work gap of not more than about .012" between the workpiece and the electrode working face as an equilibrium between the rate of material removal and the spacing distance in the work gap without making mechanical contact between the workpiece and the electrode working face, simultaneously pumping a liquid electrolyte through a closed passage to the work gap at a regulated volume and pressure so as to maintain a static pressure of not less than about 50 pounds per square inch on the electrolyte at the point of entry of the electrolyte into the work gap thereby completing a conductive path for an electrolyzing current between the workpiece and the electrode working face, impressing a high density direct current having a closely regulated substantially constant low voltage of not appreciably more than about fifteen volts between the electrode working face and the workpiece in a sense to make the workpiece anodic, and momentarily confining the flowing electrolyte at superatmospheric pressure in the work gap by the close spacing distance between the electrode working face and the workpiece, whereby eroded workpiece material is flushed away and the formation of gas bubbles in the electrolyte is inhibited.

8. In the method of electrolytically shaping an electrically conductive and electrochemically erodible workpiece by passing an electrolyzing current between the workpiece and an electrode having an electrically conductive working face closely spaced thereto in the presence of an electrolyte, the workpiece and the electrode working face being relatively movable toward each other, the improvement which comprises moving the workpiece and the electrode working face toward each other at a substantially constant movement rate so as to maintain a substantially constant work gap of not more than about .012" between the workpiece and the electrode working face as an equilibrium between the rate of material removal and the spacing distance in the work gap without making mechanical contact between the workpiece and the electrode working face, insulating and isolating the workpiece and the electrode from other equipment components, impressing a high density direct current having a closely regulated substantially constant low voltage of not appreciably more than about fifteen volts between the electrode working face and the workpiece in a sense to make the workpiece anodic, pumping liquid electrolyte through a closed passage to the work gap at a regulated volume and pressure so as to maintain a static pressure of not less than about 50 pounds per square inch on the electrolyte at the point of entry of the electrolyte into the work gap thereby completing a conductive path for the electrolyzing current between the workpiece and the electrode working face, flushing the eroded workpiece material, and inhibiting the formation of gas bubbles in the electrolyte, and momentarily confining the flowing electrolyte at superatmospheric pressure in the work gap by the close spacing distance between the electrode working face and the workpiece.

9. In the electrolytic process of removing material from an electrically conductive and electrochemically erodible workpiece by means of an electrode structure having a conductive working face, the electrode structure being movable toward the workpiece, the method which comprises substantially confining the work gap between the workpiece and the electrode working face, continuously pumping an electrolyte through a closed passage to the work gap at a regulated volume and pressure so as to maintain a static pressure of not less than about 50 pounds per square inch on the electrolyte at the point of entry of the electrolyte to the electrode structure and the work gap, discharging the electrolyte from the work gap so as to maintain high pressure on the electrolyte and high electrolyte velocity through the work gap, impressing an electric current at a potential of not appreciably greater than about fifteen volts between the electrode and the workpiece in a sense to make the electrode working face a cathode so as to remove material from the workpiece, and advancing the electrode structure at a substantially uniform rate toward the workpiece so that the electric current is maintained at a density within the range of from about 100 to about 3000 amperes per square inch of electrode working face area and the work gap spacing is maintained at not more than about .012" without at any time making mechanical contact between the electrode structure and the workpiece.

10. In the electrolytic process of removing material from an electrically conductive and electrochemically erodible workpiece by means of an electrode structure having a hollow electrode and a conductive working face, the electrode structure being movable toward and away from the workpiece, the method which comprises substantially confining the work gap between the workpiece and the electrode working face, pumping an electrolyte through a closed passage into and through the electrode at a regulated volume and pressure so as to maintain a static pressure of not less than about 50 pounds per square inch on the electrolyte at the point of entry of the electrolyte into the electrode and the work gap and so that the electrolyte exits from the electrode at the working face into and through the work gap wherein it has a superatmospheric back pressure, impressing an electric current of a potential not appreciably greater than about fifteen volts and at high current density of at least about 100 amperes per square inch between the electrode working face and the workpiece in a sense to make the electrode working face a cathode so as to remove material from the workpiece, and advancing the electrode at a substantially uniform rate into the workpiece so as to maintain a work gap spacing of between about .0005" and about .012" without at any time making mechanical contact between the electrode structure and the workpiece.

11. In the electrolytic process of removing material from an electrically conductive and electrochemically erodible workpiece by means of an electrode having at least one electrolyte passage therethrough and an electrically conductive working face, the electrode being movable relative to the workpiece to define a narrow work gap between the workpiece and the electrode working face, the method which comprises pumping an electrolyte through a closed passage to and through the electrode so that the electrolyte exits from the electrode at the working face and into and through the work gap, the electrolyte being pumped to and through the electrode and the work gap at a regulated volume and pressure so as to maintain a substantially constant static pressure on the electrolyte of not less than about 50 pounds per square inch at the point of entry of the electrolyte to the electrode and the work gap, impressing an electric current of low potential in the range of approximately four to fifteen volts and of current density in the range of approximately 100 to 3000 amperes per square inch between the electrode working face and the workpiece in a sense to make the electrode working face a cathode so as to remove material from the workpiece, advancing the electrode into the workpiece as work material is removed from the workpiece to maintain the narrow work gap at not substantially more than about .012" without making mechanical contact between the electrode and the workpiece, confining the flowing electrolyte under superatmospheric pressure in the work gap by the close spacing between the electrode working face and the workpiece, and vibrating the electrode transversely as the electrode advances.

12. In the electrolytic process of removing material from an electrically conductive and electrochemically erodible workpiece by means of an electrode structure having at least one electrolyte passage therethrough and an electrically conductive working face opposed to the workpiece to form a cavity in the workpiece of varying cross section, the electrode structure being movable relative to the workpiece, the method which comprises pumping an electrolyte through a closed passage to the electrode and into and through a narrow work gap of not more than about .012" between the workpiece and the electrode working face, the electrolyte being pumped at a regulated volume and pressure so as to maintain a static pressure on the electrolyte of not less than about 50 pounds per square inch at the point of electrolyte entry to the electrode and the work gap, impressing an electric current of a potential of not appreciably greater than about fifteen volts and high current density of at least about 100 amperes per square inch between the electrode working face and the workpiece in a sense to make the electrode working face a cathode so as to remove material from the workpiece, advancing the electrode structure into the workpiece at a variable rate while maintaining the work gap spacing at not more than the aforesaid .012", and the rate of advance having a maximum which is less than is required to cause mechanical contact between the electrode working face and the workpiece.

13. In the electrolytic process of removing material from an electrically conductive and electrochemically erodible workpiece by means of an electrode structure having at least one electrolyte passage therethrough and an electrically conductive working face, the electrode structure being movable relative to the workpiece, the method which comprises pumping an electrolyte through a closed passage to and through the electrode passage to a narrow work gap between the workpiece and the electrode working face so that the electrolyte exits from the passage at the working face, the electrolyte being pumped at a regulated volume and pressure so as to maintain a substantially constant static pressure of not less than about 50 pounds per square inch on the electrolyte at the point of entry of the electrolyte to the electrode structure and the work gap, impressing an electric current of a potential of not appreciably greater than fifteen volts and high current density of not less than about 100 amperes per square inch between the electrode working face and the workpiece in a sense to make the electrode working face cathodic so as to remove material from the workpiece, and advancing the electrode working face into the workpiece at a rate less than the rate which would cause mechanical contact between the electrode structure and the workpiece and sufficient to maintain the work gap at not substantially more than about .012" wide.

14. In the electrolytic process of removing material from an electrically conductive and electrochemically erodible workpiece by means of an electrode structure having at least one electrolyte passage therethrough and an electrically conductive working face, the electrode structure being movable relative to the workpiece, the method which comprises pumping an electrolyte through a closed passage to and through the electrolyte passage to a narrow work gap between the workpiece and the electrode working face so that the electrolyte exits from the passage at the working face, the electrolyte being pumped at a regulated volume and pressure so as to maintain a substantially constant static pressure of not less than about 90 pounds per square inch on the electrolyte at the point of electrolytic entry to the electrode structure and the work gap, impressing an electric current at a potential of not appreciably more than about fifteen volts and at a current density of not less than about 100 amperes per square inch between the electrode working face and the workpiece in a sense to make the electrode working face cathodic so as to remove material from the workpiece, and advancing the electrode working face into the workpiece at a rate sufficient to maintain the work gap spacing at not greater than about .012" and less than the rate which would cause mechanical contact between the electrode working face and the workpiece.

15. In the method of electrolytically shaping an electrically conductive and an electrochemically erodible workpiece to produce a cavity therein having a contoured bottom by means of an electrically conductive electrode wherein the electrode and the workpiece are movable relatively toward each other to define a narrow work gap between the electrode working face and the workpiece, the steps which include pumping an electrolyte through a closed passage to the work gap between the workpiece and a three dimensionally contoured frontal electrically conductive working surface of the electrode at a regulated volume and pressure so as to maintain a gauge pressure of not less than about 50 pounds per square inch on the electrolyte at the point of electrolyte entry to the work gap, passing a direct current at a voltage of not appreciably greater than about fifteen volts and of high current density between the frontal working surface of the electrode and the workpiece in a sense to make the workpiece an anode, and concurrently advancing the electrode linearly toward and into the workpiece at a rate to maintain a substantially constant work gap spacing of not substantially greater than about .012" between the workpiece and the frontal working surface of the electrode without making mechanical contact between the electrode and the workpiece.

16. In the method of electrolytically shaping an electrically conductive and an electrochemically erodible workpiece to produce a cavity therein having a contoured bottom by means of an electrically conductive electrode having one or more electrolyte passages therethrough and wherein the electrode and the workpiece are movable relatively toward each other to define a narrow work gap between the electrode working face and the workpiece, the steps which include pumping an electrolyte through a closed passage to the work gap between the workpiece and a three dimensionally contoured frontal electrically conductive working surface of the electrode at a regulated volume and pressure so as to maintain a gauge pressure of not less than about 50 pounds per square inch on the electrolyte at the point of electrolyte entry to the electrode passage and the work gap, passing a direct current at a voltage of between about four and about fifteen volts and of high current density between the frontal working surface of the electrode and the workpiece in a sense to make the workpiece an anode, and concurrently advancing the electrode linearly toward and into the workpiece at a rate to maintain the work gap between the workpiece and the frontal working surface of the electrode substantially constant and in the order of about .0005" to about .012" and without making mechanical contact between the electrode and the workpiece.

17. In the method of electrolytically shaping an electrically conductive and an electrochemically erodible workpiece by an electrically conductive electrode to produce a cavity therein having a contoured bottom having one or more electrolyte inlet passages therethrough and wherein the electrode and the workpiece are movable relatively toward each other to define a narrow work gap between the electrode working face and the workpiece, the steps which include pumping an electrolyte through a closed passage to the work gap between the workpiece and a three dimensionally contoured frontal electrically conductive working surface of an electrode at a regulated volume and pressure so as to maintain a gauge pressure of not less than about 50 pounds per square inch on the electrolyte at the point of electrolyte entry to the electrode inlet passages and the work gap, passing a direct current at a voltage of between about four and about fifteen volts and of high current density between the frontal working surface of the electrode and the workpiece in a sense to make the workpiece an anode, concurrently advancing the electrode linearly toward and into the workpiece at a rate to maintain the work gap between the workpiece and the frontal working surface of the electrode in the order of about .0005" to about .012" without making mechanical contact between the electrode and the workpiece, and removing the electrolyte from the gap through one or more electrolyte exit passages formed in the electrode while continuing pumping the electrolyte through the inlet passages.

18. In the method of electrolytically contouring an electrically conductive and electrochemically erodible workpiece, the steps of providing an electrically conductive tool having a surface thereon which is substantially the same as the surface it is desired to form in the workpiece, bringing the electrically conductive working face of an electrode into close proximity with the tool to define a narrow work gap therebetween, pumping an electrolyte through a closed passage into and through the work gap at a regulated volume and pressure so as to maintain a static pressure on the electrolyte of not less than about 50 pounds per square inch at the point of electrolyte entry to the work gap without making mechanical contact between the tool and the electrode, and impressing an electric potential between the tool and the electrode in a sense to make the electrode an anode; and subsequently connecting the electrode into an electrolyzing circuit with a workpiece to be contoured wherein the electrode working surface defines a narrow work gap with the workpiece, an electrolyte is pumped through a closed passage to the work gap at a regulated volume and pressure so as to maintain a gauge pressure of not less than about 50 pounds per square inch on the electrolyte at the point of entry to the work gap, a high density direct current of a potential not appreciably greater than fifteen volts is passed between the electrode working face and the workpiece in a sense to make the workpiece an anode, and the electrode working surface and the workpiece are moved relatively toward each other at a rate to maintain the interspace work gap spacing distance at not substantially greater than about .012" without making mechanical contact between the electrode and the workpiece.

19. In the method of electrically contouring an electrically conductive and electrochemically erodible workpiece, the steps of providing an electrically conductive tool having a surface therein which is substantially the same as the surface it is desire to form in the workpiece, bringing the electrically conductive working face of an electrode into close proximity to the tool to define a narrow work gap therebetween, pumping an electrolyte through a closed passage into and through the work gap at a regulated volume and pressure so as to maintain a static pressure of not less than about 50 pounds per square inch on the electrolyte at the point of electrolyte entry to the work gap, impressing an electric potential between the tool and the electrode in a sense to make the electrode an anode, after approximate matching of the electrode face and the tool is achieved bringing the electrode and the tool closer to each other and to within a thousandth of an inch or so of each other and shortly thereafter turning off the electric potential, and at no time making mechanical contact between the electrode face and the tool; and subsequently connecting the electrode into an electrolyzing circuit with a workpiece to be contoured wherein the electrode working surface defines a narrow interspace work gap with the workpiece, an electrolyte is pumped through a closed passage to the interspace work gap at a regulated volume and pressure so as to maintain a gauge pressure of not appreciably less than about 50 pounds per square inch on the electrolyte at the point of electrolyte entry to the interspace work gap, a high density direct current having a potential of not appreciably more than fifteen volts is passed between the electrode working face and the workpiece in a sense to make the workpiece an anode, and the electrode working face and the workpiece are moved relatively toward each other at a rate to maintain the spacing distance in the interspace work gap at not substantially greater than about .012" without making mechanical contact between the electrode and the workpiece.

References Cited in the file of this patent

UNITED STATES PATENTS

| | | |
|---|---|---|
| 35,099 | Lemley | Apr. 29, 1862 |
| 607,484 | Reider | July 19, 1898 |
| 1,320,208 | Curtis | Oct. 28, 1919 |
| 1,915,847 | Brant | June 27, 1933 |
| 2,025,206 | Holslay | Dec. 24, 1935 |
| 2,383,383 | Harding | Apr. 21, 1945 |
| 2,385,198 | Engle | Sept. 18, 1945 |
| 2,399,289 | Negus | Apr. 3, 1946 |
| 2,441,319 | Harding | May 11, 1948 |
| 2,457,234 | Herbert et al. | Dec. 28, 1948 |
| 2,490,302 | Holfelder | Dec. 6, 1949 |
| 2,650,979 | Teubner | Sept. 1, 1953 |
| 2,684,939 | Geese | July 27, 1954 |
| 2,698,832 | Swanson | Jan. 4, 1955 |
| 2,721,839 | Taylor | Oct. 25, 1955 |
| 2,739,935 | Kehl | Mar. 27, 1956 |
| 2,762,946 | Manchester | Sept. 11, 1956 |
| 2,783,199 | Comstock | Feb. 26, 1957 |
| 2,798,846 | Comstock | July 9, 1957 |
| 2,813,966 | Matulaitis | Nov. 19, 1957 |
| 2,827,427 | Barry | Mar. 18, 1958 |
| 2,844,531 | Prince | July 22, 1958 |
| 2,848,410 | Knuth-Winterfeldt et al. | Aug. 19, 1958 |
| 2,872,405 | Miller | Feb. 3, 1959 |
| 2,902,584 | Ullman | Sept. 1, 1959 |

(Other references on following page)

3,058,895

| 41 | | | | 42 | |
|---|---|---|---|---|---|
| UNITED STATES PATENTS | | | 748,485 | Great Britain | May 2, 1956 |
| 2,905,605 | Keeleric | Sept. 22, 1959 | 1,109,473 | France | Jan. 30, 1956 |
| 2,920,026 | Kistler | Jan. 5, 1960 | 1,153,749 | France | Mar. 20, 1958 |
| 2,937,124 | Vaughn | May 17, 1960 | | | |
| 2,939,825 | Faust | June 7, 1960 | OTHER REFERENCES | | |
| 2,958,636 | Hershinger | Nov. 1, 1960 | Bleiweiss et al.: "Electrochemical Removal of Broken Tools," Metals and Alloys, November 1943, pages 1075–1080. | | |
| FOREIGN PATENTS | | | | | |
| 335,003 | Great Britain | Sept. 18, 1930 | Steel, Feb. 21, 1944, page 92. | | |

UNITED STATES PATENT OFFICE
CERTIFICATE OF CORRECTION

Patent No. 3,058,895                                              October 16, 1962

Lynn A. Williams

It is hereby certified that error appears in the above numbered patent requiring correction and that the said Letters Patent should read as corrected below.

Column 8, line 5, for "projection" read -- projecting --; column 9, line 67, for "vase" read -- base --; column 10, line 33, for "is" read -- it --; column 17, line 7, for "existing" read -- exiting --; column 18, line 50, for "thorugh" read -- through --; column 24, line 70, for "electrolyte", second occurrence, read -- electrode --; line 71, for "electrode" read -- electrolyte --; column 26, lines 65 and 66, strike out "and channels 377 which extend relatively parallel to the working face"; column 30, line 9, after "wattage" insert a dash; line 13, for "minum" read -- minimum --; column 31, lines 59 and 60, for "routing" read -- routine --; column 32, line 27, for "is", second occurrence, read -- in --; column 34, line 23, for "ampers" read -- amperes --.

Signed and sealed this 7th day of May 1963.

(SEAL)
Attest:

ERNEST W. SWIDER                                                   DAVID L. LADD

Attesting Officer                                                       Commissioner of Patents